United States Patent
Cookman et al.

(10) Patent No.: US 12,150,013 B2
(45) Date of Patent: Nov. 19, 2024

(54) CONCURRENT OPERATION OF SPS RECEIVER AND WIRELESS TRANSMITTER

(71) Applicant: QUALCOMM Incorporated, San Diego, CA (US)

(72) Inventors: Jordan Cookman, San Jose, CA (US); Liang Zhao, Saratoga, CA (US); Angelica Wong, Palo Alto, CA (US); Krishnaranjan Rao, Sunnyvale, CA (US); Chang Row, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/194,587

(22) Filed: Mar. 31, 2023

(65) Prior Publication Data

US 2023/0283989 A1 Sep. 7, 2023

Related U.S. Application Data

(63) Continuation of application No. 17/937,407, filed on Sep. 30, 2022, now Pat. No. 11,622,238, which is a
(Continued)

(51) Int. Cl.
*H04W 4/029* (2018.01)
*G01S 19/21* (2010.01)
(Continued)

(52) U.S. Cl.
CPC .............. *H04W 4/029* (2018.02); *G01S 19/21* (2013.01); *G01S 19/32* (2013.01); *G01S 19/33* (2013.01);
(Continued)

(58) Field of Classification Search
CPC . H04W 72/0453; H04W 16/14; H04W 24/02; H04W 72/1205; H04W 4/029;
(Continued)

(56) References Cited

U.S. PATENT DOCUMENTS

| | | |
|---|---|---|
| 6,799,050 B1 | 9/2004 | Krasner |
| 7,453,396 B2 | 11/2008 | Levin et al. |

(Continued)

FOREIGN PATENT DOCUMENTS

| | | |
|---|---|---|
| CN | 103155448 A | 6/2013 |
| CN | 106716169 A | 5/2017 |

(Continued)

OTHER PUBLICATIONS

International Search Report and Written Opinion—PCT/US2021/028617—ISA/EPO—Aug. 10, 2021.
(Continued)

*Primary Examiner* — Lewis G West
(74) *Attorney, Agent, or Firm* — Thien T. Nguyen

(57) ABSTRACT

A mobile device may be configured to perform concurrent Satellite Positioning System (SPS) operation and wireless communications when uplink signals transmitted by the mobile device interferes with the reception of SPS signals in one or more frequency bands. The mobile device may determine if the SPS receiver has already acquired SPS signals and is in a tracking state. If the SPS receiver is not in a tracking state, an SPS acquisition procedure is initiated before the wireless communication session is initiated. The SPS acquisition procedure is performed until the SPS receiver reaches a tracking state, or until a timeout is reached. Once the SPS receiver is in a tracking state, the wireless communication session may be initiated, during which the SPS receiver is controlled, e.g., to perform signal blanking, measurement exclusion, or disable SPS reception, to mitigate interference with SPS signals.

25 Claims, 12 Drawing Sheets

Related U.S. Application Data continuation of application No. 17/236,896, filed on Apr. 21, 2021, now Pat. No. 11,463,843.

(60) Provisional application No. 63/021,519, filed on May 7, 2020, provisional application No. 63/021,522, filed on May 7, 2020.

(51) Int. Cl.
| | |
|---|---|
| *G01S 19/32* | (2010.01) |
| *G01S 19/33* | (2010.01) |
| *H04W 72/0453* | (2023.01) |
| *H04W 72/541* | (2023.01) |
| *H04W 76/10* | (2018.01) |
| *G01S 19/22* | (2010.01) |

(52) U.S. Cl.
CPC ..... *H04W 72/0453* (2013.01); *H04W 72/541* (2023.01); *H04W 76/10* (2018.02)

(58) Field of Classification Search
CPC ..... H04W 76/10; H04W 72/082; G01S 19/21; G01S 19/32; G01S 19/33
See application file for complete search history.

(56) References Cited

U.S. PATENT DOCUMENTS

| | | |
|---|---|---|
| 10,064,208 B2 | 8/2018 | Chrisikos |
| 10,412,752 B2 | 9/2019 | Wu et al. |
| 10,560,205 B2 | 2/2020 | Budyta et al. |
| 11,075,689 B1 | 7/2021 | Hassan et al. |
| 11,463,843 B2 | 10/2022 | Cookman et al. |
| 11,622,238 B2 | 4/2023 | Cookman et al. |
| 2002/0193108 A1 | 12/2002 | Robinett |
| 2004/0239559 A1 | 12/2004 | King et al. |
| 2008/0045146 A1* | 2/2008 | Wahlberg ........... H04B 7/18573 455/12.1 |
| 2008/0287124 A1 | 11/2008 | Karabinis |
| 2012/0122449 A1 | 5/2012 | Monte et al. |
| 2014/0036882 A1 | 2/2014 | Baghel et al. |
| 2014/0240173 A1 | 8/2014 | Shah et al. |
| 2015/0198718 A1 | 7/2015 | Khalili et al. |
| 2016/0037434 A1 | 2/2016 | Gopal et al. |
| 2016/0088634 A1 | 3/2016 | Wang et al. |
| 2017/0006620 A1* | 1/2017 | Reis .................. H04B 7/18517 |
| 2017/0202025 A1 | 7/2017 | Ouchi et al. |
| 2017/0230104 A1* | 8/2017 | Purkayastha ...... H04B 7/18541 |

FOREIGN PATENT DOCUMENTS

| | | | |
|---|---|---|---|
| WO | 2004001993 A1 | 12/2003 | |
| WO | 2013120517 A1 | 8/2013 | |
| WO | WO-2016044015 A1 * | 3/2016 | ........... G01S 5/0045 |
| WO | 2016184040 A1 | 11/2016 | |
| WO | 2017016588 A1 | 2/2017 | |
| WO | 2017034704 A1 | 3/2017 | |
| WO | 2018121208 A1 | 7/2018 | |

OTHER PUBLICATIONS

European Search Report—EP23182338—Search Authority—Munich—Oct. 12, 2023.

Zhu H., et al., "Can GPS Device Also Interfere with TD Mobile Communications?", China Academic Journal Electronic Publishing House, China Radio, vol. 5, p. 59, May 26, 2016, 2 page.

* cited by examiner

CONCURRENT OPERATION OF SPS RECEIVER AND WIRELESS TRANSMITTER

CROSS-REFERENCE TO RELATED APPLICATIONS

This application is a Continuation of U.S. application Ser. No. 17/937,407, entitled "CONCURRENT OPERATION OF SPS RECEIVER AND WIRELESS TRANSMITTER" and filed on Sep. 30, 2022, which is a continuation of U.S. application Ser. No. 17/236,896, entitled "METHODS AND APPARATUS FOR CONCURRENT OPERATION OF SPS RECEIVER AND WIRELESS TRANSMITTER" and filed on Apr. 21, 2021, which claims the benefit of and priority to U.S. Provisional Application No. 63/021,519, filed May 7, 2020, entitled "METHODS AND APPARATUS FOR CONCURRENT OPERATION OF SPS RECEIVER AND WIRELESS TRANSMITTER," and U.S. Provisional Application No. 63/021,522, filed May 7, 2020, entitled "METHODS AND APPARATUS FOR CONCURRENT OPERATION OF SPS RECEIVER AND WIRELESS TRANSMITTER," all of which are assigned to the assignee hereof and are incorporated herein by reference in their entireties.

BACKGROUND OF THE DISCLOSURE

1. Field of the Disclosure

Aspects of the disclosure relate generally to wireless communications and positioning.

2. Description of the Related Art

A receiver for Satellite Positioning Systems (SPS) and a transceiver for wireless communication systems are often embedded in a mobile device, such as a mobile phone, a wearable device, a laptop computer, an Internet of Thing (IoT) device, etc. SPS, for example, may include Global Navigation Satellite System (GNSS), such as Global Positioning System (GPS), while wireless communication systems include, e.g., terrestrial Wireless Wide Area Networks (WWAN), such as Long-Term Evolution (LTE) or Fifth Generation New Radio (5G NR), non-terrestrial WWANs, e.g., satellite communication systems, and Wireless Local Area Networks (WLAN), such as Wi-Fi. The SPS receiver may receive SPS signals from satellite vehicles and provide the SPS signals to a positioning operation, whereas the wireless communication transceiver may receive and transmit wireless data and control signals for various communication operations. The wireless communication signals, or their harmonics, may be in or very near the same frequency band as the SPS signals. Moreover, the wireless communication signals may be transmitted with significantly greater power than the SPS signals. Consequently, if a mobile device receives SPS signals and transmits the wireless communication signals simultaneously to support concurrent communication and positioning operations, the wireless communication signals or their harmonics may interfere with the SPS signals, which can adversely affect the reception of the SPS signals as well as the positioning operation of the mobile device.

There are many scenarios where concurrent communication and positioning operations are desirable or even needed. As an example, a user may use the mobile device to make a phone call and to navigate a locale at the same time while driving, or for emergency services. As another example, some applications may use the positioning function and the communication function concurrently, such as real-time position tracking and reporting applications. As such, there is need for improvement in the field of wireless communication devices to manage concurrent SPS and wireless communication operations.

SUMMARY

A mobile device may be configured to perform concurrent Satellite Positioning System (SPS) operation such as acquisition and tracking and wireless communications when uplink signals transmitted by the mobile device interferes with the reception of SPS signals in one or more frequency bands. The mobile device may determine if the SPS receiver has already acquired SPS signals and is in a tracking state. If the SPS receiver is not in a tracking state, an SPS acquisition procedure is initiated before the wireless communication session is initiated. The SPS acquisition procedure is performed until the SPS receiver reaches a tracking state, or until a timeout is reached. Once the SPS receiver is in a tracking state, the wireless communication session may be initiated, during which the SPS receiver is controlled, e.g., to perform signal blanking, measurement exclusion, or disable SPS reception, to mitigate interference with SPS signals. The mobile device may measure SPS signals in a first frequency band that is interfered with by the uplink signals transmissions for one or more measurement dwell times that are aligned, e.g., actually aligned or effectively aligned, with the uplink signal transmission and that are no longer than the off duration of the uplink signal transmissions. The SPS signals in the first frequency band may be used in an acquisition state and a tracking state. Additionally, SPS signals in a second frequency band that is not interfered with by the uplink signal transmissions may be measured during the on duration or both the on and off durations of the uplink signal transmissions and may be used for SPS signal acquisition and tracking.

In one implementation, a method for supporting concurrent operation of wireless communications and satellite positioning system (SPS) tracking performed by a mobile device, includes detecting a request to initiate a wireless communication link with a wireless transceiver in a wireless communication network; determining if satellite positioning system (SPS) signals have been acquired for tracking; acquiring SPS signals for tracking with an SPS receiver when it is determined that SPS signals have not already been acquired, wherein the SPS signals have multiple frequency bands; initiating the wireless communication link with the wireless transceiver, wherein transmission of uplink signals on the wireless communication link interferes with at least one of the multiple frequency bands in the SPS signals; and concurrently performing wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals.

In one implementation, a mobile device configured to support concurrent operation of wireless communications and satellite positioning system (SPS) tracking, includes a satellite positioning system (SPS) receiver configured to receive SPS signals over multiple frequency bands; a wireless transmitter configured to transmit uplink signals in a wireless communication link with a wireless transceiver in a wireless communication network; at least one memory; at least one processor coupled to the SPS receiver, the wireless transmitter, and the at least one memory and configured to: detect a request to initiate the wireless communication link with the wireless transceiver in the wireless communication network; determine if the SPS receiver has acquired SPS signals for tracking; cause the SPS receiver to acquire SPS for tracking when it is determined that SPS signals have not already been acquired, wherein the SPS signals have multiple frequency bands; initiate the wireless communication link with the wireless transceiver via the wireless transmitter, wherein transmission of the uplink signals on the wireless communication link interferes with at least one of the multiple frequency bands in the SPS signals; and concurrently perform wireless communications on the wireless communication link with the wireless transceiver and tracking the SPS signals by being configured to control the SPS receiver to mitigate interference of the transmission of the uplink signals on the wireless communication link with the at least one of the multiple frequency bands in the SPS signals.

In one implementation, a mobile device configured to support concurrent operation of wireless communications and satellite positioning system (SPS) tracking, includes means for detecting a request to initiate a wireless communication link with a wireless transceiver in a wireless communication network; means for determining if satellite positioning system (SPS) signals have been acquired for tracking; means for acquiring SPS signals for tracking with an SPS receiver when it is determined that SPS signals have not already been acquired, wherein the SPS signals have multiple frequency bands; means for initiating the wireless communication link with the wireless transceiver, wherein transmission of uplink signals on the wireless communication link interferes with at least one of the multiple frequency bands in the SPS signals; and means for concurrently performing wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals.

In one implementation, a non-transitory storage medium including program code stored thereon, the program code is operable to configure at least one processor in a mobile device to support concurrent operation of wireless communications and satellite positioning system (SPS) tracking, includes program code to detect a request to initiate a wireless communication link with a wireless transceiver in a wireless communication network; program code to determine if satellite positioning system (SPS) signals have been acquired for tracking; program code to acquire SPS signals for tracking with an SPS receiver when it is determined that SPS signals have not already been acquired, wherein the SPS signals have multiple frequency bands; program code to initiate the wireless communication link with the wireless transceiver, wherein transmission of uplink signals on the wireless communication link interferes with at least one of the multiple frequency bands in the SPS signals; and program code to concurrently perform wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals.

In one implementation, a method for supporting concurrent performance of wireless communications and satellite positioning system (SPS) operation performed by a mobile device, includes determining a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver; determining a measurement dwell time based on the off duration of the uplink signal transmission; and performing SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals.

In one implementation, a mobile device configured to support concurrent performance of wireless communications and satellite positioning system (SPS) operation, the mobile device includes a satellite positioning system (SPS) receiver configured to receive SPS signals over multiple frequency bands; a wireless transmitter configured to transmit uplink signals in a wireless communication link with a wireless transceiver in a wireless communication network; at least one memory; at least one processor coupled to the SPS receiver, the wireless transmitter, and the at least one memory and configured to: determine a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver; determine a measurement dwell time based on the off duration of the uplink signal transmission; and perform SPS signal acquisition or SPS signal tracking using SPS signals received in a first frequency band by the SPS receiver for the measurement dwell time aligned with the off duration of the uplink signal transmission, and not use the SPS signals received in the first frequency band by the SPS receiver during the on duration of the uplink signal transmission, wherein the first frequency band is interfered with by transmissions of uplink signals.

In one implementation, a mobile device configured to support concurrent performance of wireless communications and satellite positioning system (SPS) operation, includes means for determining a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver; means for determining a measurement dwell time based on the off duration of the uplink signal transmission; and means for performing SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals.

In one implementation, a non-transitory storage medium including program code stored thereon, the program code is operable to configure at least one processor in a mobile device to support concurrent performance of wireless communications and satellite positioning system (SPS) operation, includes program code to determine a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver; program code to determine a measurement dwell time based on the off duration of the uplink signal transmission; and program code to perform SPS signal acquisition or SPS signal tracking using SPS signals received in a first frequency band by the SPS receiver for the measurement dwell time aligned with the off duration of the uplink signal transmission, and not use the SPS signals received in the first frequency band by the SPS receiver during the on duration of the uplink signal transmission, wherein the first frequency band is interfered with by transmissions of uplink signals.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
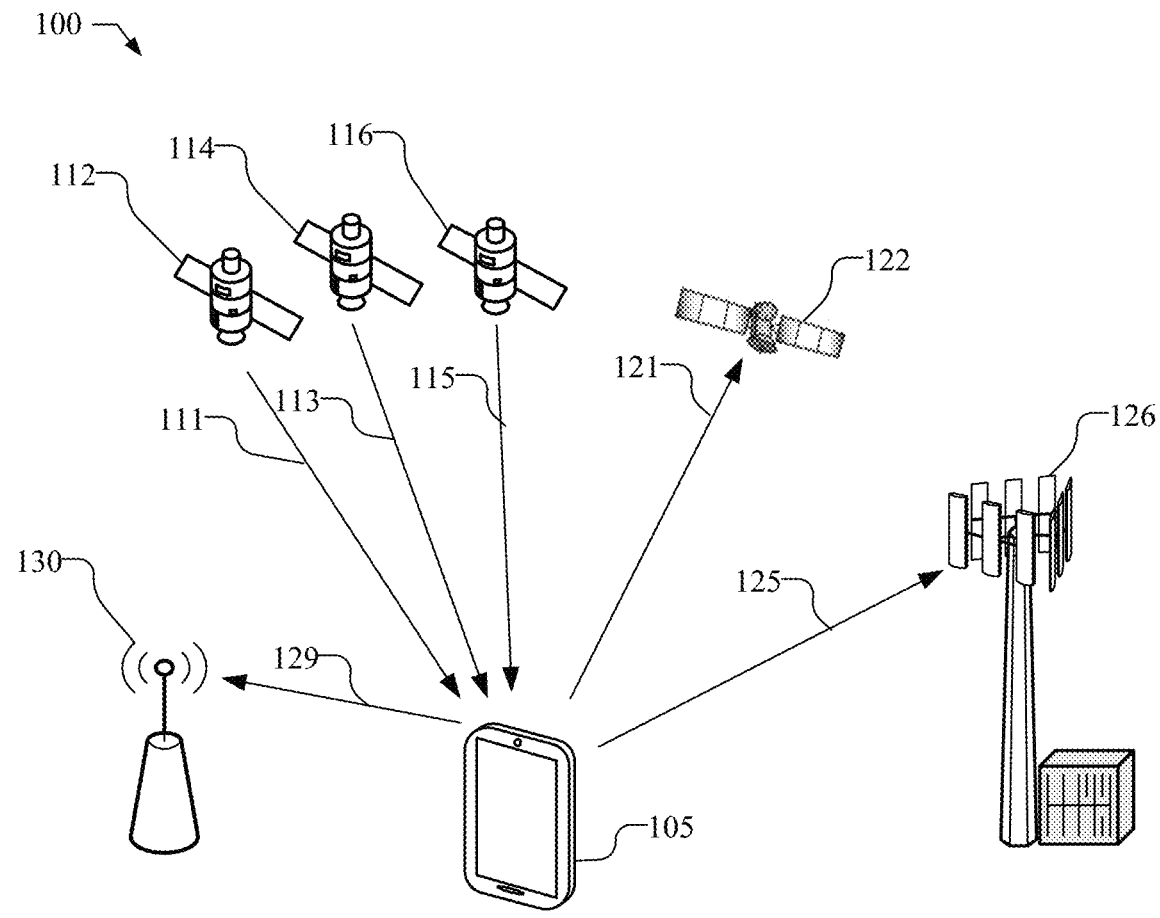
FIG. 1 illustrates a simplified diagram of a system in which reception of SPS signals by the mobile device may be affected by the transmission of wireless communication signals by a mobile device.

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

Satellite Positioning System (SPS) receivers and wireless transmitters, such as Wireless Wide Area Network (WWAN) and Wireless Local Area Network (WLAN) transmitters, are often embedded in a mobile device, such as a mobile phone, a wearable device, a laptop computer, an Internet of Thing (IoT) device, or a semiautonomous or autonomous vehicle, such as a ground vehicle, i.e., a self-driving car or truck, or an aerial vehicle, such as a unmanned aerial vehicle (UAV) sometimes referred to as a drone, etc. The SPS receiver may receive SPS signals from satellite vehicles and performs positioning operations based on the received SPS signals. The SPS receiver may support different global or regional positioning systems, such as Global Positioning System (GPS) signals, Global Navigation Satellite System (GLONASS) signals, Galileo signals, BeiDou signals, and/or signals of other type of satellite positioning system.

The wireless transmitter transmits and receives wireless signals for various communication operations, including data and control. A WWAN transmitter may support various communications systems including, for example, include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Additionally, the WWAN transmitter may support non-terrestrial, e.g., satellite-based, communication systems. In some implementations, satellite-based communication systems may be combined with terrestrial wireless communications systems, such as 5G New Radio (NR) networks. In such a system, mobile device may access a satellite, also referred to as a satellite vehicle (SV), instead of a terrestrial base station, which may connect to an earth station, also referred to as a ground station or non-terrestrial (NTN) gateway, which in turn may connect to a 5G network. A WLAN transmitter may support various communications systems including Wi-Fi, Long-Term Evolution (LTE) Direct, etc.

The WWAN (either terrestrial based or non-terrestrial based) and WLAN signals (hereinafter, "wireless network signals"), or their harmonics, can be in or near the same frequency band as the SPS signals and may interfere with the SPS signals, which can adversely affect the positioning operation of the mobile device. For example, wireless communication transmissions to some satellite vehicles may be at least partially in the Institute of Electrical and Electronics Engineers (IEEE) L1 band. Further, the power at which wireless communication signals, such as with satellite communication systems, may be transmitted at significantly greater power, e.g., approximately 150 db, than the received SPS signals. If a mobile device receives SPS signals and transmits the wireless network signals simultaneously to support concurrent communication and positioning operations, the wireless network signals or their harmonics may interfere with the SPS signals. The interference may cause issues with SPS reception, including interfering with the ability to acquire and track SPS signals, as well as reduced sensitivity and increased probability of false detection, where the interfering signal is mistakenly detected as a SPS satellite signal. False detection can be especially harmful and can cause very large position errors.

There are many scenarios where concurrent communication and positioning operations are desirable or even needed. As an example, a user may use the mobile device to make a phone call and to navigate a locale at the same time while driving. In another example, emergency services may require concurrent communication and positioning. As another example, some applications may use the positioning function and the communication function concurrently, such as real-time position tracking and reporting applications. For example, in semiautonomous or autonomous vehicle use cases, concurrent position tracking and communication are necessary. As a result of the interference, the capability of a mobile device providing concurrent communication and positioning operations can be degraded.

There are techniques to mitigate the effect of wireless network signals interference on positioning operations. One technique includes improving the isolation of the SPS and WWAN/WLAN components on the device and/or reducing the amount of non-linearity in the coupling path between WWAN/WLAN transmitter and SPS receiver, to reduce the interference of wireless network signals on the SPS signals. This technique, however, relies on complex hardware filters, which are difficult and/or expensive to design to provide sufficient isolation and linearity, particularly when the interfering communication signal transmission is significantly stronger, e.g., 150 dB, than the received SPS signals.

Another technique may include not using the interfered SPS signals for measurement operations, e.g., measurement exclusion. For example, SPS signals that are received while wireless communication signals are transmitted may be flagged as "Do Not Use" and the positioning engine will not use these SPS signals. Similarly, instead of flagging the SPS signals that suffer from interference, the SPS signals may simply not be provided to the positioning engine.

Another technique may include disabling the reception of a SPS signal of a particular frequency band whenever the mobile device is connected to a wireless network and transmitting uplink signals that may interfere with the SPS signals in that frequency band.

Another technique may include blanking the interfered SPS signals when the mobile device is actively transmitting on or simply connected to an interfering wireless network signal band. Signal blanking may be enabled through additional functionality of a SPS receiver. For example, the SPS receiver may include functionality that, when enabled, configures the SPS receiver to ignore radio signals received via an antenna element. The signal blanking functionality may include forcing the output of an analog or digital signal processing device or operation to a zero or null value or sequence of values when the mobile device is transmitting on or connected to an interfering wireless network signal band. Typically, however, the blanking patterns associated with, e.g., LTE TDD, have blanking periods of 10 ms or less and a duty cycle of 50% or less, and the blanking process does not require significant modification to SPS signal measurement procedures. In some implementations, however, such as with satellite communication, the blanking periods would be required to be greater than is with duty cycles greater than 50%, and conventional signal blanking may not ensure optimal operation.

The SPS receiver may support multiple frequency bands, including one or more bands that are not interfered with by the wireless transmitter. For example, the SPS receiver may receive signals in the L1 band as well as the L2 band, the L5 band, or the L2+L5 band. Signals in the L1 band are more likely to be interfered with than signals in the L2 band or the L5 band. In some instances, however, the signals available in the frequency bands that are not interfered with, e.g., the L2 or L5 bands, are less suitable for acquisition procedures compared to signals in the frequency bands that are interfered with, e.g., the L1 band. In such an instance, the interference of the SPS signals due to concurrent communications transmissions may prevent the acquisition of the SPS signals. Moreover, available techniques for mitigating the effects of wireless signal interference on positioning operations discussed above, such as signal blanking, are not of assistance because reception of the SPS signals is necessary for SPS signal acquisition.

Disclosed herein are techniques for supporting concurrent performance of wireless communications and SPS operation such as acquisition and tracking, e.g. where the SPS receiver receives SPS signals in multiple frequency bands. SPS signals in one or more frequency bands, sometimes referred to herein as a first band, may be interfered with by uplink transmission by the mobile device, while SPS signals in other frequency bands, sometimes referred to herein as a second band, may be less suitable for signal acquisition. When a wireless communication session is requested, the mobile device may determine if the SPS receiver is already in a tracking state, i.e., has already acquired and is tracking SPS signals. If the SPS receiver is not in a tracking state, an SPS acquisition procedure is initiated using the first band signals before uplink communication signals are transmitted in order to avoid interference with the SPS signals during acquisition. The SPS acquisition procedure may be performed until the SPS receiver reaches a tracking state, or, e.g., until a timeout is reached. Once the SPS receiver is in a tracking state, or after timeout is reached, the wireless communication session may be initiated and uplink communication signals may be transmitted. During the wireless communication session, e.g., while transmitting uplink signals, appropriate techniques may be employed to mitigate interference with SPS signal in the first band by the transmitted uplink signals, such as signal blanking, measurement exclusion, or disable SPS reception.

In some implementations, in the case where the timeout is reached and the SPS acquisition procedure has not been completed, the acquisition operation may be continued, e.g., either using SPS signals from the second band or using SPS signals from the first band with signal blanking or dwell alignment. With dwell alignment, the SPS receiver performs a measurement dwell that begins when the wireless transmitter stops transmitting and ends before or when the wireless transmitter starts transmitting. The continued acquisition operation may be seeded with the results of the initial (incomplete) acquisition attempt. For example, during the continued acquisition operation, it may be possible to eliminate one or more of the satellite vehicle identification, the time and/or frequency windows, and dwell times that have already been searched in the initial (incomplete) acquisition attempt. While the use of a continued acquisition operation may be worse in terms of sensitivity and/or time to first fix compared to using a continuous signal in the first band, this procedure permits wireless communications to begin without further delays and may be preferred to the SPS acquisition failing completely after a timeout occurs.

In one implementation, one or more the frequency bands may be interfered with by uplink transmission by the mobile device, while SPS signals in other frequency bands may be less suitable for signal acquisition. The SPS receiver may align the SPS signal measurement dwell time with periods when the wireless transmitter is not transmitting wireless signals. For example, the start of an uplink signal transmission may be determined, along with the on duration and the off duration of the uplink signal transmissions. The measurement dwell time for a frequency band that is interfered with by the uplink signal transmissions may be based on the off duration of the uplink signal and the measurement dwell time may be aligned with the uplink signal transmissions. Accordingly, the SPS signals in the frequency band that is interfered with may be measured by the SPS receiver while the uplink signal is not transmitted, and is not measured while the uplink signal is transmitted.

FIG. 1 illustrates a simplified diagram of a system 100 in which reception of SPS signals by the mobile device 105 may be affected by the transmission of wireless communication signals by the mobile device 105. The SPS signals may be transmitted based on various satellite position signaling standards, such as a Global Positioning System (GPS), Global Navigation Satellite System (GLONASS), Galileo, BeiDou, and/or other type of satellite positioning system. A mobile device 105 may include a satellite positioning system (SPS) receiver that may be compatible with one or more of these satellite position signaling standards. The SPS receiver may process the SPS signals based on the signaling standards to extract information and perform a position calculation operation based on the extracted information.

Mobile device 105 may be a device designed to perform numerous functions, including the ability to determine its own position based on the reception of SPS signals from satellites. Mobile device 105 is able to perform satellite-based positioning by receiving SPS signals from one or more satellites. As shown here, mobile device 105 receives SPS signals 111, 113, and 115 from positioning satellites 112, 114, and 116, respectively. The SPS may be, e.g., a Global Navigation Satellite System (GNSS) such as GPS, GLONASS, Galileo or Beidou or some other local or regional system such as Indian Regional Navigation Satellite System (IRNSS), European Geostationary Navigation Overlay Service (EGNOS) or Wide Area Augmentation System (WAAS).

Typically, each of the SPS signals 111, 113, and 115 would include timing information relating to when the SPS signal was transmitted from the respective satellite. Each SPS signal may also include ephemeris information which may be used to determine the position of the satellite at the time the SPS signal is transmitted. Mobile device 105 is able to determine when it receives each of the SPS signals 111, 113, and 115. The transmission time and reception time of each SPS signal may be aligned on a common timing reference, such as a common clock, known to the mobile device 105. By taking the difference between the reception time and transmission time, mobile device 105 may compute the flight time associated with each SPS signal, for it to travel from the respective satellite to mobile device 105. The flight time may then be used to compute the distance between each satellite and mobile device, based on the speed of signal propagation, i.e., the speed of light. Once the distance between each satellite and the mobile device is found, multilateration may be used to compute the position of mobile device 105, based on the known position of each satellite and the distance between each satellite and mobile device 105.

In addition to satellite-based positioning, a significant category of functions performed by mobile device 105 relates to wireless communications. Wireless communications may serve as an important link in connecting mobile device 105 over private and/or public networks with other devices such as servers and other mobile devices. This may include communication over various types of wireless networks, including wireless local area networks (WLAN) and wireless wide area networks (WWAN), among others. Examples of WLANs may be different types of Wi-Fi networks, such as those implemented based on various 802.11 standards. FIG. 1 illustrates wireless communications between the mobile device 105 and a terrestrial base station, a satellite vehicle, and an access point. However, other examples of wireless communications may include peer-to-peer communications between mobile devices such as Wi-Fi Direct, Long-Term Evolution (LTE) Direct, or Proximity-based Services (ProSe) Direction Communication (PC5), etc. Examples of WWAN may include satellite communications, 5G NR, LTE, wideband code division multiple access (WCDMA), and the like. Additional examples of wireless communications may include near field communications (NFC), Bluetooth communications, etc.

As used herein, the terms "mobile device" and "base station" are not intended to be specific or otherwise limited to any particular Radio Access Technology (RAT), unless otherwise noted. In general, a mobile device may be any wireless communication device (e.g., a mobile phone, router, tablet computer, laptop computer, tracking device, wearable (e.g., smartwatch, glasses, augmented reality (AR)/virtual reality (VR) headset, etc.), semiautonomous or autonomous ground vehicle (e.g., automobile, truck motorcycle, bicycle, drone, etc.), semiautonomous or autonomous aerial vehicle (e.g., UAV or drone), Internet of Things (IoT) device, etc.) used by a user to communicate over a wireless communications network. A mobile device may be mobile or may (e.g., at certain times) be stationary, and may communicate with a Radio Access Network (RAN). As used herein, the term "mobile device" may be referred to interchangeably as an "user equipment," "access terminal" or "AT," a "client device," a "wireless device," a "subscriber device," a "subscriber terminal," a "subscriber station," a "user terminal" or UT, a "mobile terminal," a "mobile station," or variations thereof. Generally, mobile devices may communicate with a core network via a RAN or in some cases a communication satellite, and through the core network the mobile devices may be connected with external networks such as the Internet and with other mobile devices. Of course, other mechanisms of connecting to the core network and/or the Internet are also possible for the mobile devices, such as over wired access networks, wireless local area network (WLAN) networks (e.g., based on IEEE 802.11, etc.) and so on.

In the example shown in FIG. 1, mobile device 105 performs wireless communications by sending signals to and receiving signals from one or more communication satellites via a wireless communication link. For instance, mobile device 105 may send a communication signal 121 to a communication satellite 122 on a wireless communication link. It should be understood that the communication satellite 122 is separate from positioning satellites 112, 114, and 116 and is not part of the SPS. The communication satellite 122 may be part of a wireless communication network, such a 5G New Radio (NR) or some other wireless access type such as Code Division Multiple Access (CDMA). The mobile device 105 may transmit and receive data and control signals to and from the communication satellite 122 via the wireless communication link 121.

As further illustrated in FIG. 1, the mobile device 105 may additionally or alternatively support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR), etc. For instance, mobile device 105 may send a communication signal 125 on a wireless communication link to a base station 126 and a communication signal 129 to an access point 130 on a wireless communication link. The base station 126, for example, may be part of a Radio Access Technology (RAT) and may support LTE or 5G NR communications, and access point 130 may support IEEE 802.11 WiFi. FIG. 1 highlights the wireless signals transmitted from mobile device 105 (as opposed to wireless signals received by mobile device 105), because various embodiments discussed herein address techniques to reduce interference caused by such transmitted signals, but it should be understood that communication signals may be both transmitted and received by the mobile device 105 via the wireless communication links.

If mobile device 105 simultaneously attempts to receive SPS signals such as signals 111, 113, and 115 and transmit wireless communication signals such as signals 121, 125, and 129, interference may cause issues with the SPS signal reception, including the inability to acquire the SPS signals, as well as reduced sensitivity and increased probability of false detection. Interference, for example, may occur if received SPS signals 111, 113, and 115 and any of transmitted wireless signals 121, 125, and 129 utilize common or overlapping, or even nearby, frequency bands. The interference, for example, may be caused by spectral emissions from adjacent or close frequency bands, particularly if the transmission power is significantly greater than the SPS signal, which may cause the signal bands to be saturated when the wireless communication signals are transmitted, preventing the SPS receiver in the mobile device 105 from receiving SPS signals in those bands. Interference may further occur even when received SPS signals 111, 113, and 115 and transmitted wireless signals 121, 125, and 129 do not utilize common or overlapping frequency bands, but intermodulation products introduce interference.

Figure 2:
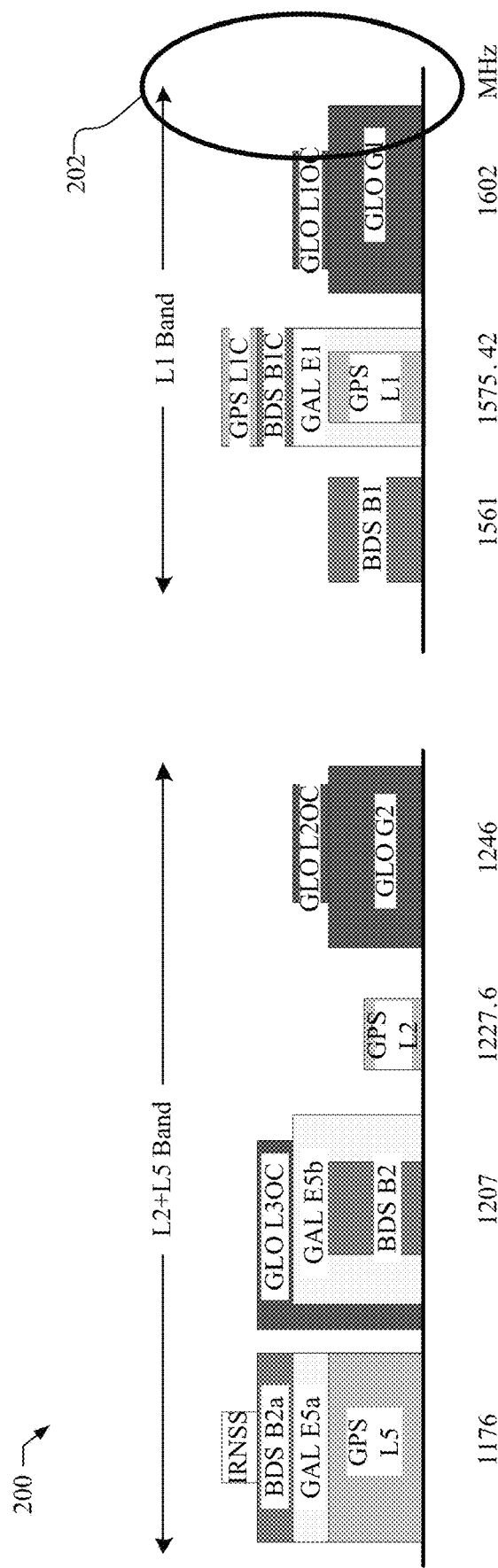
FIG. 2 illustrates an example spectrum diagram of SPS signals and wireless communication signals.

FIG. 2 illustrates examples of SPS signals and their frequency bands 200. As shown in FIG. 2, a first set of SPS frequency signals may occupy a frequency band of 1166-1249 MHz, which corresponds to the IEEE L2 band and L5 band. The first set of SPS signals may include, for example, IRNSS signal, BeiDou B2a signal (labelled "BDS B2a"), Galileo E5a and E5$b$ signals (labelled "GAL E5a" and "GAL E5$b$"), GPS L2 and L5 signals (labelled "GPS L2" and "GPS L5"), and GLONASS G2, L2OC, and L3OC signals (labelled "GLO G2," "GLO L2OC," and "GLO L3OC," respectively). Each of the first set of SPS signals includes a carrier of a pre-determined frequency. For example, IRNSS, BDS B2a, GAL E5a, and GPS L5 each has a carrier frequency of 1176 MHz, GAL E5b and BDS B2 has a carrier frequency of 1207 MHz, GPS L2 has a carrier frequency of 1227.6 MHz, whereas GLO G2 has a carrier frequency of 1246 MHz+k*437.5 kHz, where k ranges from −7 to +6, GLO L2OC has a carrier frequency of 1248.06 MHz, and GLO L3OC has a carrier frequency of 1202.025 MHz.

Moreover, a second set of SPS signals may occupy a frequency band of 1559-1606 MHz, which corresponds to the IEEE L1 band. The second set of SPS signals may include, for example, BeiDou B1 signal (labelled "BDS B1"), BeiDou B1C signal (labelled "BDS B1C"), Galileo E1 signal (labelled "GAL E1"), GPS L1 and L1C signals (labelled "GPS L1" and GPS L1C), and GLONASS G1 and L1OC signals (labelled "GLO G1" and "GLO L1OC"). Each of the second set of SPS signals also includes a carrier of a pre-determined frequency. For example, BDS B1 has a carrier frequency of 1561 MHz, BDS B1C, GAL E1, GPS L1, and GPS L1C each has a carrier frequency of 1575.42 MHz, GLO L1OC has a carrier frequency of 1600.995 MHz, whereas GLO G1 has a carrier frequency of 1602 MHz+ k*562.5 kHz, where k ranges from −7 to +6.

The WWAN signals, such as LTE, as well as the WLAN signals, may be outside of the L1 and L2+L5 band of the aforementioned SPS signal. However, intermodulation (IM) products or harmonic distortion of the WLAN and WWAN signals may result in signals which fall into the L1 band and may potentially interfere with the SPS signals.

As an example, the following interference signals may result from concurrent operation of SPS and communication transceivers: (A) Long term evolution (LTE) B13/B14 (777-798 MHz uplink), second harmonics falls in the SPS L1 band (e.g., 2×780 MHz=1600 MHz); (B) 800 MHz WWAN and 2.4 GHz WLAN, second order IM product (IM2) falls at 1.6 GHz (e.g., 2.4 GHz-800 MHz); and (C) 1.7/1.9 GHz WWAN and 5 GHz WLAN, third order IM product falls at 1.6 GHz (e.g., 5 GHz-2×1.7 GHz).

As can be seen, even though WLAN signals at 2.4 GHz or 5 GHz and WWAN signals at 800 MHz or 1.7/1.9 GHz may not necessarily utilize the same frequency as SPS signals of the L1 band, it is possible for IM products resulting from the mixing of such WLAN and WWAN signals to land in the same frequencies utilized by SPS signals.

Moreover, some WWAN signals, such as with satellite communication systems, transmit in the 1610-1625.5 MHz range, e.g., illustrated by area 202 in FIG. 2, and, thus, may at least partially overlap with the L1 band. Additionally, the uplink transmit signal levels for some communications may be approximately 150 dB stronger than the received SPS signals. Consequently, the front end of the L1 band radio receiver will be saturated during uplink transmissions, e.g., in one or more sections of the front end, including the RF (radio frequency), IF (intermediate frequency), or DFE (digital front end.), which will prevent reception of all SPS signals within the L1 band.

The SPS receiver in the mobile device 105 may be capable of receiving multiple frequency bands, including one or more bands (the first band) that will be interfered with by uplink transmissions and one or more bands (the second band) that are less likely to be interfered with. Further, the SPS signals available in the second band may be less suitable for acquisition procedures compared to SPS signals in the first band. For example, the SPS receiver in the mobile device 105 may receive frequency bands in both the L1 band and the L2 and/or L5 bands. Uplink communication transmissions may interfere with the reception of SPS signals in the L1 band, but not the L2 band or the L5 band. However, SPS signals in the L2 band or the L5 band are less suitable for acquisition procedures than SPS signals in the L1 band.

Interference with SPS signals in the first band, e.g., in the L1 band, may prevent the mobile device 105 from acquiring SPS signals for tracking while transmitting communication signals. Further, interference mitigation techniques, such as signal blanking, cannot be used during SPS signal acquisition because these techniques eliminate the SPS signals. If the SPS signals cannot be received during the acquisition procedure due to interference or interference mitigation techniques, the SPS receiver may never reach a tracking state and concurrent operation of SPS tracking and wireless communications may not be possible.

Accordingly, in one implementation, concurrent operation of SPS tracking and wireless communications is performed by first determining if the SPS receiver is in a tracking state, e.g., characterized by small satellite search spaces in frequency and time domains. If the SPS receiver is not in a tracking state, an SPS acquisition procedure may be initiated before the wireless communication session is initiated. The SPS acquisition procedure may be performed until the SPS receiver reaches a tracking state, or, e.g., until a timeout is reached. Once the SPS receiver is in a tracking state, or after timeout is reached, the wireless communication session may be initiated. During the wireless communication session, e.g., while transmitting uplink signals, appropriate techniques may be employed to mitigate interference with SPS signal, such as signal blanking, measurement exclusion, or disable SPS reception.

If the timeout is reached without SPS signal acquisition, the SPS acquisition procedure may end and the wireless communications may begin. In some implementations, an entity, such as a location services client may be given the option of continuing with the SPS signal acquisition procedure or to proceed to the wireless communications. In another implementation, if timeout is reached without SPS signal acquisition, the acquisition operation may be continued, e.g., either using SPS signals from the second band (the non-interfered band) or using SPS signals from the first band with signal blanking or dwell alignment. With signal blanking, the SPS receiver sets SPS signals received while the wireless transmitter is transmitting communication signals to a zero or null value or sequence of values. With dwell alignment, the SPS receiver does not measure SPS signals while the wireless transmitter is transmitting communication signals, e.g., by aligning the measurement dwell time to measure SPS signals only during the off transmission periods of the wireless transmitter. The continued acquisition operation may be seeded with the results of the initial (incomplete) acquisition attempt. Thus, the wireless communication session may begin after timeout is reached, but the SPS acquisition procedure may be continued.

Measurements of SPS satellite signals are typically generated based on measurement dwells of anywhere from 20 ms to 12 seconds. The measurement dwell typically consists of a coherent integration period, e.g., 20 ms, and a number of non-coherents, e.g., 50. The measurement dwells use correlation windows consisting of time and frequency dimensions. The window dimensions are sized to cover the SPS receiver's time and frequency uncertainty for a given satellite, which are derived from the SPS receiver's knowledge of its position and time, along with knowledge of the satellite's position. These uncertainties are generally largest during initial acquisition procedures when the SPS receiver may only have a coarse knowledge of its position and time and are generally smallest during tracking procedures when the SPS receiver may accurately predict the time and frequency of a given satellite signal.

During a wireless transmission session, the wireless transmitter may be active for only part of the time. For example, the wireless transmitter may be active for 2 seconds out of every 2.56 seconds or for some other duration and/or ratio. The wireless transmitter may provide an indication to the SPS receiver whenever the wireless transmitter is active, e.g., a transmission active indicator. In some implementations, the wireless transmitter may also provide an indication to the SPS receiver of how long the wireless transmitter will be on or off. Alternatively, the duration of the wireless transmitter's on and off periods may be fixed quantities that are known by the SPS receiver in advance.

When a wireless transmission session is active, the SPS receiver may perform measurement dwells using SPS signals received while the wireless transmitter is off. In other words, the SPS signal measurement dwell times may be aligned with periods when the wireless transmitter is not transmitting wireless signals. The SPS receiver may limit the number of non-coherents to the largest multiple of coherent integration periods that will fit in the off period of the wireless transmitter. The measurement dwell time is a total integration time produced based on a product of a coherent integration interval and a number of non-coherents. The number of non-coherents may be selected to ensure that the total integration time is equal to or less than the off duration of the uplink signal transmission. Accordingly, the SPS signals received in the frequency band that is interfered with may be measured by the SPS receiver when there are no uplink signal transmissions, and not measured during uplink signal transmissions to avoid interference. In some implementations, the SPS receiver may continue to receive SPS signals in the frequency band that is interfered with but may blank the SPS signals during the on duration of the uplink signal transmission. The SPS receiver may include blanked signals in the measurement operation, wherein the blanked signals do not contribute substantially to the measurement results, and report a time stamp associated with the measurement that effectively aligns the measurement dwell time with the off duration of the uplink signal transmission.

In some implementations, the SPS receiver may perform multiple measurement dwells during the wireless transmitter off period. For example, the sum of the total integration time for each measurement dwell should fit in the off period. This option may be useful for applications, such as semiautonomous or autonomous ground or aerial vehicles that require higher rate position updates. For example, a typical application of this type may require 10 Hz position updates, meaning 100 ms measurement dwells. In that case, if the wireless transmitter off period is 0.56 s, then up to five measurement dwells may be performed during the off period.

In some implementations, the SPS signal data received during the wireless transmitter off period may be stored in memory and played back to correlator hardware, such that measurement processing can be performed while the wireless transmitter is active. Storing the SPS signal data for processing during signal transmissions optimizes the usage of correlator and other hardware resources at the expense of memory for signal storage. Moreover, the SPS signal data received during the wireless transmitter off period may be used in non-coherent integration with SPS signal data received from consecutive off periods. For example, if a measurement operation is not successful for a given satellite within the available off period, the SPS receiver may save the correlation results, and continue with non-coherent integration during the next available off period.

During an acquisition procedure, if a measurement operation for a given satellite using measurement dwells aligned with the wireless transmitter off period is successful, the SPS receiver may perform a verification measurement operation for that satellite. The verification measurement operation may be performed in the same or in a subsequent wireless transmitter off period. Compared to the measurement operation used for acquisition, the verification measurement operation generally has a smaller correlation window and a detection threshold with a smaller probability of false detection. It may also have longer non-coherent integration period. Additionally, after the verification operation, the SPS receiver may perform a bit-edge detection or secondary code synchronization operation in one or more subsequent wireless transmitter off periods. Non-coherent integration can be used to combine results from more than one off period.

Moreover, during the acquisition procedure, it may be desirable to decode a time parameter broadcast by a satellite, for example the Time of Week (TOW) parameter broadcast by GPS satellites. Knowledge of this time parameter allows the receiver to reduce its time uncertainty, resulting in faster time to complete the acquisition procedure and generate a position fix. Since the SPS receiver is only able to receive portions of the SPS signals when the wireless transmitter is off, it may not be possible to synchronize to the broadcast data stream and decode the time parameter. To work around this issue, the SPS receiver may use the acquisition results from the interfered SPS band to initiate a tracking procedure on a second SPS band which is not interfered by the wireless transmitter. The SPS receiver may receive signals on the second SPS band continuously, enabling it to synchronize to the broadcast data stream and decode the time parameters.

Once the acquisition procedure is complete, the SPS receiver may track the SPS signals received on the first SPS band, i.e., the interfered band, using measurement dwells aligned with the wireless transmitter off period. The SPS receiver may additionally track the SPS signal received continuously on the second SPS band, i.e., the non-interfered band. In some implementations, the SPS signal received on the second SPS band, i.e., the non-interfered band, may be tracked only during the wireless transmitter on period and the SPS receiver may switch to track the SPS signal on the first SPS band, i.e., the interfered band, during the wireless transmitter off period.

Figure 3A:
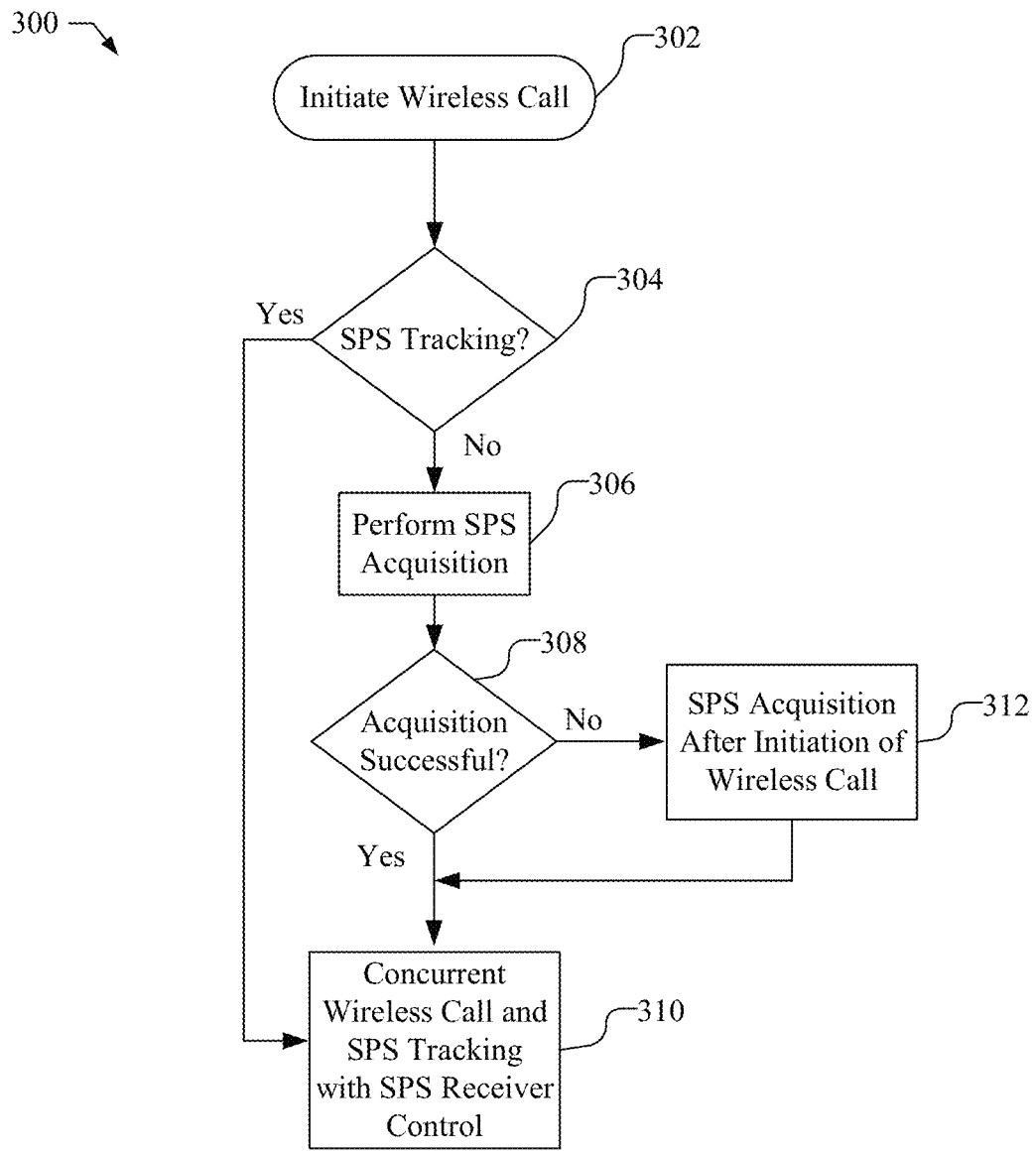
FIGS. 3A, 3B, and 3C illustrate flowcharts for a concurrent wireless transmission with multiband SPS procedures.

FIG. 3A, for example, illustrates a flowchart 300 of a concurrent performance of wireless transmission with multiband SPS operation procedure. As illustrated, block 302 mobile device 105 determines that a wireless call, i.e., wireless communication session, is to be initiated. For example, a request for initiation of a wireless communication may be received, e.g., from the mobile device 105 or from an external entity.

At decision 304, the mobile device 105 determines whether the SPS receiver is performing SPS tracking, i.e., in a tracking state. If the SPS receiver is already in a tracking state, wireless communication transmissions may start immediately, and the process may flow to block 310. If the SPS receiver is not in a tracking state, the mobile device 105 may allow time for SPS acquisition before starting wireless communication transmissions. For example, the mobile device 105 may delay the initiation of the wireless communication or in some implementations, if the wireless communication has already been initiated, the mobile device 105 may pause wireless communication transmissions.

At block 306, the mobile device 105 performs an SPS acquisition procedure prior to initiating the wireless call, during which SPS signals are acquired and tracked by the SPS receiver. During SPS signal acquisition, relatively large satellite search spaces in frequency and time domains may be used, compared to that used during SPS tracking. The acquisition of the SPS signals may use a frequency band of SPS signals that would be interfered with if uplink signals were transmitted by the mobile device 105.

The SPS acquisition procedure may include multiple operations. For example, an initial acquisition operation may be used to identify available satellite vehicles, e.g., using a relatively large correlation window in frequency and time domains with a relatively high probability of false alarm (Pfa). A verification measurement operation uses a smaller correlation window and a detection threshold with a smaller probability of false detection (Pfa). The SPS receiver may additionally perform at least one of bit edge detection or secondary code synchronization operation. Further, a time decode operation may be used to synchronize to the broadcast data stream and decode time parameters in the SPS signals allowing the SPS receiver to reduce the time uncertainty and collapse the search space for signal tracking. The SPS acquisition time may depend on the SPS receiver state, e.g., cold start, warm start, or hot start modes, whether the SPS receiver has valid Almanac data and Ephemeris data, has a rough knowledge of its position, etc. The acquisition time may further depend on the environment, such as whether the mobile device is in open-sky, an urban canyon, indoors, etc., and the number and positions of satellites. The SPS acquisition procedure may include a timeout, which may be used to stop the SPS acquisition procedure or change the procedure if the acquisition process is taking too long, e.g., 4 seconds or longer. The length of the timeout may be chosen as a tradeoff of the probability of successful SPS acquisition and the speed of completion of the wireless communication.

At decision 308, for example, it is determined whether the SPS acquisition is successful. Decision 308 may occur before the timeout period, e.g., if the acquisition procedure finishes early, or after the timeout period. If the SPS acquisition is successful, the process flows to block 310, and if the SPS acquisition is not successful, the process may flow to block 312. In some implementations, if the SPS signals have not been acquired by the end of the timeout period, the SPS acquisition procedure may end, and the process may proceed to the wireless communication without SPS signal tracking. In some implementations, the entity that requested the wireless communication, e.g., an external entity or the user of the mobile device, may be informed of the SPS acquisition timeout and may be given the option to proceed to the wireless communication or to continue to try to acquire SPS signals.

When the SPS signals have been acquired and the SPS receiver is in a tracking state, e.g., as determined at decision 304 or 308, the process flows to block 310 during which the mobile device 105 performs concurrent engagement of wireless calls and SPS tracking, e.g., by controlling the SPS receiver to mitigate interference when wireless communication signals are transmitted. For example, when wireless signals are transmitted, the SPS receiver will continue to track the SPS signals continuously from one or more frequency bands that are not interfered with, while blanking SPS signals on the one or more interfered bands. For example, the SPS signals in the interfered bands may be blanked by replacing the signals with a zero signal or fixed sequence whenever the wireless transmitter is active. Instead of signal blanking, measurement exclusion may be used, in which SPS signals on all bands, including the one or more interfered bands, are received, but measurements from SPS signals in the frequency bands that are interfered with by the wireless transmitter are excluded from use in positioning or timing calculations. Another alternative is to completely disable reception of the SPS signals that are in frequency bands interfered with by the wireless transmitter, while continuing to receive signals on one or more other SPS bands that are not interfered.

If the SPS signals have not been acquired by the end of the timeout period and the SPS receiver is not a tracking state, e.g., as determined at decision 308, the process may flow to block 312 during which the mobile device 105 initiates the wireless communication and continues the SPS acquisition process. For example, in some implementations, the SPS receiver may continue the SPS acquisition process using SPS signals on a frequency band (Band 2) that is not interfered with by the wireless communication signal transmissions. In another implementation, the SPS receiver may continue the SPS acquisition process using SPS signals on the frequency band (Band 1) that is interfered with by the wireless communication signal transmissions using signal blanking or dwell alignment. For example, with signal blanking, the SPS receiver sets SPS signals received in Band 1 while the wireless transmitter is transmitting communication signals to a zero or null value or sequence of values.

In another example, measurement dwell alignment may be used so the SPS receiver measures SPS signals while the wireless transmitter is not transmitting communication signals and does not measure SPS signals while the wireless transmitter is transmitting communication signals. For example, the wireless transmitter may provide a transmission active indicator to the SPS receiver indicating when the wireless transmitter begins or stops wireless transmissions. The SPS receiver may begin measuring SPS signals when the transmission active indicator indicates the wireless transmitter has stopped wireless transmissions. The SPS receiver may limit the measurement dwell time to be no longer than the off duration of the signal transmissions. For example, the off duration of an uplink signal transmission may be provided to the SPS receiver or may be preconfigured and stored in memory. The measurement dwell time is a total integration time produced based on a product of a coherent integration interval and a number of non-coherents. The SPS receiver may adjust the number of non-coherents to ensure that the total integration time is equal to or less than the off duration of the uplink signal transmission.

The continued acquisition operation may be seeded with the results of the initial (incomplete) acquisition attempt. For example, during the continued acquisition operation, it may be possible to eliminate one or more of the satellite vehicle identification, the time and/or frequency windows, and dwell times that have already been searched in the initial (incomplete) acquisition attempt.

Once SPS signal acquisition in block 312 is complete, the process may flow to block 310 for concurrent engagement of wireless communication and SPS tracking as discussed above.

Figure 3B:
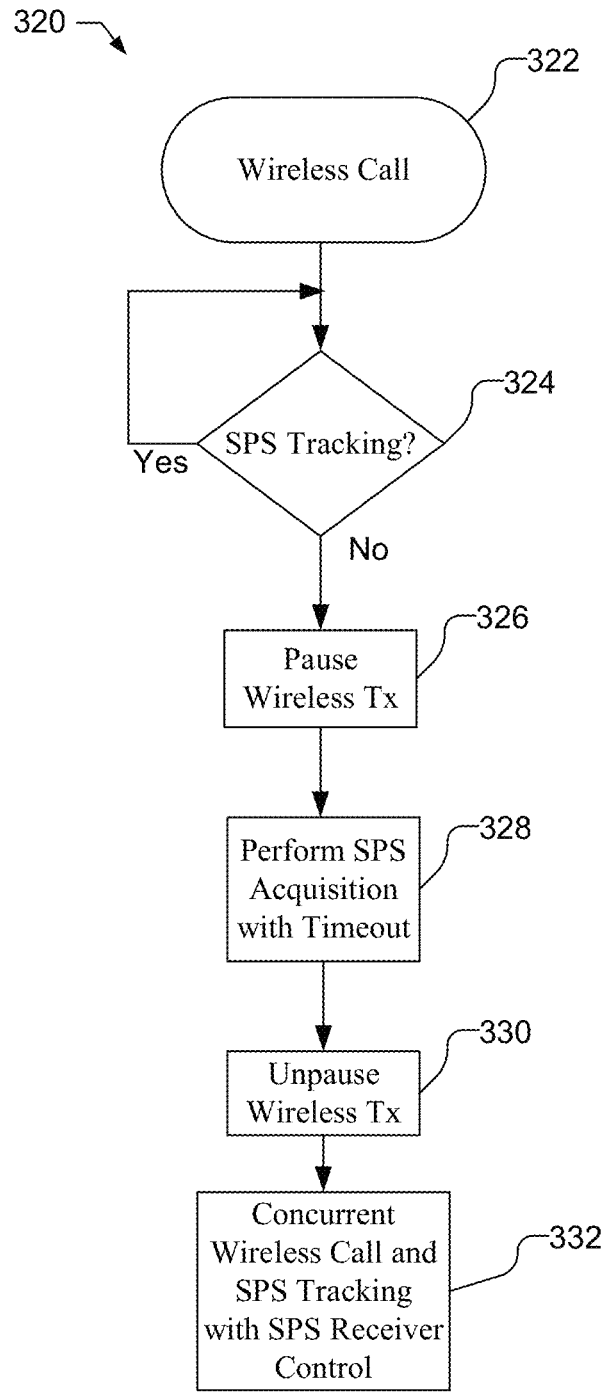

FIG. 3B is a flowchart 320 illustrating an extension of the concurrent performance of wireless transmission with multiband SPS operation procedure. Flowchart 320 illustrates a process in which mobile device 105 is already engaged in a wireless call, e.g. wireless communication has already been initiated. For example, the mobile device 105 may start a wireless call before SPS acquisition occurs. In another example, the mobile device 105 may have already performed the process illustrated in FIG. 3A and may be performing concurrent wireless call and SPS tracking in block 310, when the SPS receiver exits the tracking state, e.g., due to failing to receive SPS signals for a period of time, but the wireless call continues.

At block 322, the mobile device 105 is engaged in a wireless call. The mobile device 105 may or may not be concurrently engaged in SPS tracking.

At decision 324, the mobile device 105 determines whether the SPS receiver is performing SPS tracking. If the SPS receiver is in a tracking state, then the concurrent wireless call and SPS tracking may continue, as discussed in block 310 of FIG. 3A. If the SPS receiver is not in a tracking state, the process may flow to block 326 to allow time for SPS acquisition before transmitting wireless communication signals. For example, the mobile device 105 may not yet have engaged in SPS tracking. In another implementation, the mobile device 105 may have been engaged in concurrent wireless call and SPS tracking at block 322, but the mobile device 105 may have exited the tracking state, e.g., which may be caused by the SPS receiver not detecting the SPS signals for a period of time.

At block 326, the mobile device 105 may pause or stop wireless transmissions to allow time for SPS acquisition.

At block 328, the mobile device 105 performs an SPS acquisition procedure during which SPS signals are acquired and tracked by the SPS receiver, e.g., similar to block 306 in FIG. 3A. The SPS acquisition procedure may include a timeout.

When the SPS signals have been acquired and the SPS receiver is in a tracking state, e.g., after block 328, the process flows to block 330 during which the mobile device 105 starts wireless transmissions again.

At block 332, the mobile device 105 may perform concurrent wireless calls and SPS tracking, e.g., by controlling the SPS receiver to mitigate interference when wireless communication signals are transmitted, e.g., similar to block 310 in FIG. 3A.

Figure 3C:
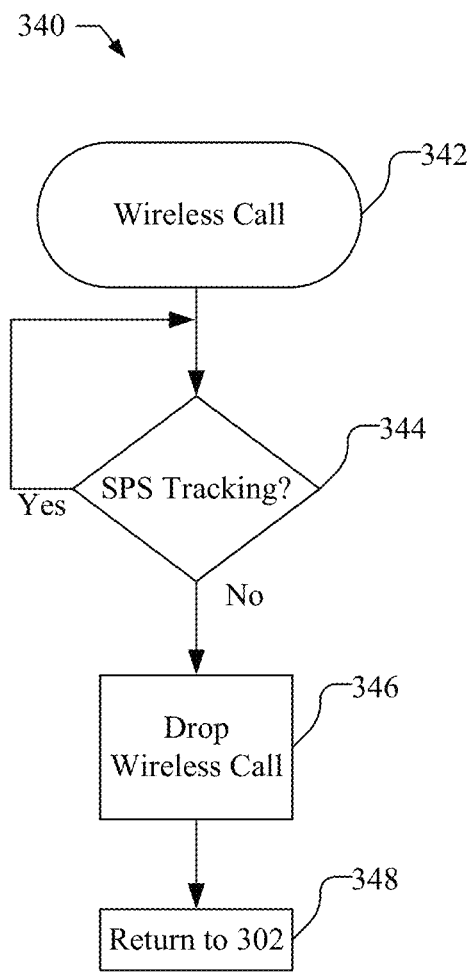

FIG. 3C is a flowchart 340 illustrating an extension of the concurrent performance of wireless transmission with multiband SPS operation procedure. Similar to flowchart 320 in FIG. 3B, flowchart 340 illustrates a process in which mobile device 105 is already engaged in a wireless call, e.g. wireless communication has already been initiated. For example, the mobile device 105 may have already performed the process illustrated in FIG. 3A and may be performing concurrent wireless call and SPS tracking in block 310, when the SPS receiver exits the tracking state, e.g., due to failing to receive SPS signals for a period of time, but the wireless call continues.

At block 342, the mobile device 105 is engaged in a wireless call. The mobile device 105 may or may not be concurrently engaged in SPS tracking.

At decision 344, the mobile device 105 determines whether the SPS receiver is performing SPS tracking. If the SPS receiver is in a tracking state, then the concurrent wireless call and SPS tracking may continue, as discussed in block 310 of FIG. 3A. If the SPS receiver is not in a tracking state, the process may flow to block 346 to allow time for SPS acquisition before transmitting wireless communication signals. For example, the mobile device 105 may have been engaged in concurrent wireless call and SPS tracking at block 342, but the mobile device 105 may have exited the tracking state, e.g., which may be caused by the SPS receiver not detecting the SPS signals for a period of time.

At block 346, the mobile device 105 may drop the wireless call.

At block 348, the mobile device 105 may return to block 302 of FIG. 3A.

Figure 4:
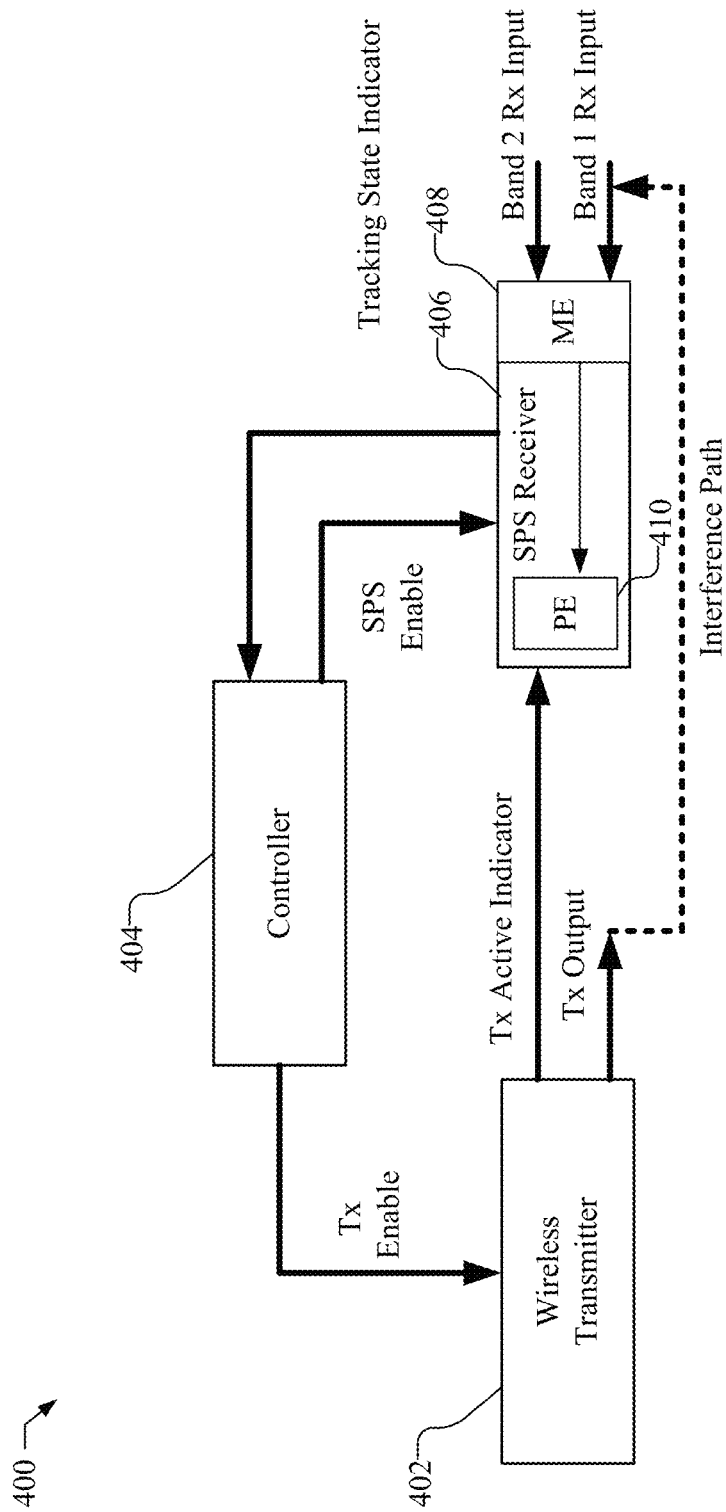
FIG. 4 is a block diagram illustrating a communication system that can facilitate concurrent reception of SPS signals and transmission of wireless communication signals.

FIG. 4 is a block diagram illustrating a communication system 400 that can facilitate concurrent reception of SPS signals and transmission of wireless communication signals. As shown in FIG. 4, the communication system 400 includes a wireless transmitter 402, a controller 404, and an SPS receiver 406. The communication system 400 may be part of a mobile device, such as mobile device 105.

The wireless transmitter 402, for example, may be part of a wireless transceiver, and may transmit wireless communication signals in a wireless communication link, e.g., when enabled by the controller 404 via a transmission (Tx) enable signal. Wireless transmitter 402, for example, may transmit wireless signals for various communication protocols/standards, such as satellite communications, 5G NR, LTE, Wi-Fi, etc., and may communicate with wireless transmitters, such as communication satellite 122, base station 126, or access point 130 shown in FIG. 1. The wireless transmitter 402 may assert a transmission (Tx) active indicator signal whenever the wireless transmitter 402 is actively transmitting.

The controller 404 may manage the procedures illustrated in FIGS. 3A, 3B, and 3C. The controller 404, for example, may provide an SPS enable signal to the SPS receiver 406 indicating when the SPS receiver 406 is to begin SPS acquisition and tracking. The controller 404 may receive a tracking state indicator signal from the SPS receiver 406 when the SPS receiver 406 is in a tracking state. The controller 404 may further provide a transmission (Tx) enable signal to the wireless transmitter 402 to indicate when the wireless transmitter 402 may begin transmitting wireless communication signals.

The SPS receiver 406 receives SPS signals, which may be used for positioning of the mobile device. The SPS receiver 406, for example, may receive SPS signals of various satellite position signaling standards, such as Global Positioning System (GPS), Global Navigation Satellite System (GLONASS), Galileo, BeiDou, and/or other type of satellite positioning system. The SPS receiver 406 may be partitioned into a measurement engine (ME) 408 and a position engine (PE) 410, which, in some cases, operate independently. In some implementations, the position engine (PE) 410 may be outside of the mobile device, e.g., in a location server. The SPS receiver 406 receives SPS signals in two or more frequency bands, e.g., a first band (Band 1) on Band 1 Rx input and a second band (Band 2) on Band 2 Rx input. As illustrated by the interference path, the transmission of wireless communication signals by the wireless transmitter 402 may interfere with the reception of SPS signals on one or more of the SPS signal (frequency) bands, e.g., with Band 1 signals received on the on Band 1 Rx input. As illustrated, however, the wireless communication signals transmitted by the wireless transmitter 402 may not interfere with the reception of SPS signals on other frequency bands, e.g., Band 2 signals received on the Band 2 Rx input. The interference mechanism may be radiated or conducted.

The SPS receiver 406 may receive an SPS enable signal from the controller 404, which instructs the SPS receiver 406 to perform, e.g., SPS acquisition and tracking. The SPS receiver 406 may further provide a tracking state indicator signal to the controller 404, e.g. to indicate when the SPS receiver 406 has acquired SPS signals and is in a tracking state.

The SPS receiver 406 may further receive a transmission active indicator signal from the wireless transmitter 402 indicating when the wireless transmitter 402 is transmitting a wireless communication signal. In response to the transmission active indicator signal from the wireless transmitter 402, the SPS receiver 406 may control the measurement engine (ME) 408 and/or position engine (PE) 410 to mitigate the interference of the transmission of the wireless communication transmission with the SPS signals in at least one of the multiple frequency bands, e.g. signals received on the Band 1 Rx input, while continuing to receive SPS signals in frequency bands that are not interfered with by the wireless transmissions, e.g. signals received on the Band 2 Rx input. For example, the measurement engine (ME) 408 in the SPS receiver 406 may blank the SPS signals received on Band 1 Rx input, e.g., marking the signals with a zero signal or a fixed sequence, whenever the transmission active indicator signal indicates that the wireless transmitter 402 is transmitting wireless communication signals. Alternatively, the measurement engine (ME) 408 may completely disable reception of signals on the Band 1 Rx input when the transmission active indicator signal indicates that the wireless transmitter 402 is transmitting wireless communication signals. In another implementation, when the transmission active indicator signal indicates that the wireless transmitter 402 is transmitting wireless communication signals received on the Band 1 Rx input may be flagged by the measurement engine (ME) 408 as "Do Not Use," when they are provided to the position engine (PE) 410 or the measurement engine (ME) may simply not send these signals to the position engine (PE). Similarly, the position engine (PE) 410 may receive the Tx active indication signal directly from the wireless transmitter 402 or the controller 404 and may not use the signals received on the Band 1 Rx input when the transmission active indicator signal indicates that the wireless transmitter 402 is transmitting wireless communication signals.

The SPS receiver 406 may perform SPS signal acquisition, as well as tracking using SPS signals received in the frequency bands that are interfered with by the transmitted wireless communication signals, e.g., Band 1 signals received on Band 1 Rx input, by aligning the measurement dwell time with the off durations of the wireless communication signal transmissions. The SPS receiver 406 may receive the transmission active indicator signal from the wireless transmitter 402 indicating when the wireless transmitter 402 is transmitting a wireless communication signal. The SPS receiver 406 may further receive an indication of the duty cycle of the wireless communication signal transmissions, e.g., along with the transmission active indicator signal, as part of the transmission active indicator signal, or previously configured and stored in memory. The SPS receiver 406 may configure the measurement dwell time to be equal to or less than the off duration of the wireless communication signal transmission. For example, the measurement dwell time may be a total integration time based on a product of a coherent integration interval and a number of non-coherents, and the number of coherents may be selected to produce a total integration time that is equal to or less than the off duration. The SPS receiver 406 aligns the measurement dwell time with the off duration of the wireless communication signal transmission, e.g., by beginning the measurement of Band 1 signals received on Band 1 Rx input when the transmission active indicator signal indicates the start of an off duration of the wireless communication signal transmission. The measurement dwell time is constrained to be equal to or less than the off duration of the wireless communication signal transmission and, accordingly, the Band 1 signals received on the Band 1 Rx input are not measured during wireless communication signal transmissions, thereby avoiding interference caused by the wireless communication signal transmissions. Accordingly, the SPS signals in frequency Band 1 received on Band 1 Rx input may be used for acquisition procedure as well as SPS signal tracking without interference caused by the wireless communication signal transmissions.

In another implementation, the SPS receiver 406 may configure the measurement dwell time to be more than the off duration of the wireless communication signal transmission. The SPS receiver 406 may continue to receive Band 1 signals received on Band 1 Rx input but may blank the signals, e.g., using signal blanking, during wireless communication signal transmissions, i.e., during an on period of the wireless transmission. The SPS receiver 406 may include blanked signals in the measurement operation, wherein the blanked signals do not contribute substantially to the measurement results, and report a time stamp associated with the measurement that effectively aligns the measurement dwell time with the off duration of the uplink signal transmission.

The SPS receiver 406 may measure Band 2 signals received on Band 2 Rx input during both the off and on durations of the wireless communication signal transmissions because SPS signals in frequency Band 2 may not be interfered with by the wireless communication signal transmissions. The SPS signals in frequency Band 2, however, may be less suitable for SPS signal acquisition than SPS signals in frequency Band 1, and thus, SPS signals in Band 2 may be for SPS signal tracking. In some implementations, the SPS signals in Band 2 may also be used for SPS signal acquisition, for example, to decode time during the acquisition procedure or other acquisition operations. In some implementations, the SPS receiver 406 may measure Band 2 signals received on Band 2 Rx input only during on durations of the wireless communication signal and may switch to measure the Band 1 signals received on Band 1 Rx input during the off durations of the wireless communication signal, e.g., during tracking or during acquisition and tracking. For example, the SPS receiver 406 may be capable of receiving only one frequency band at a time, but may be capable of switching between multiple bands.

Figure 5:
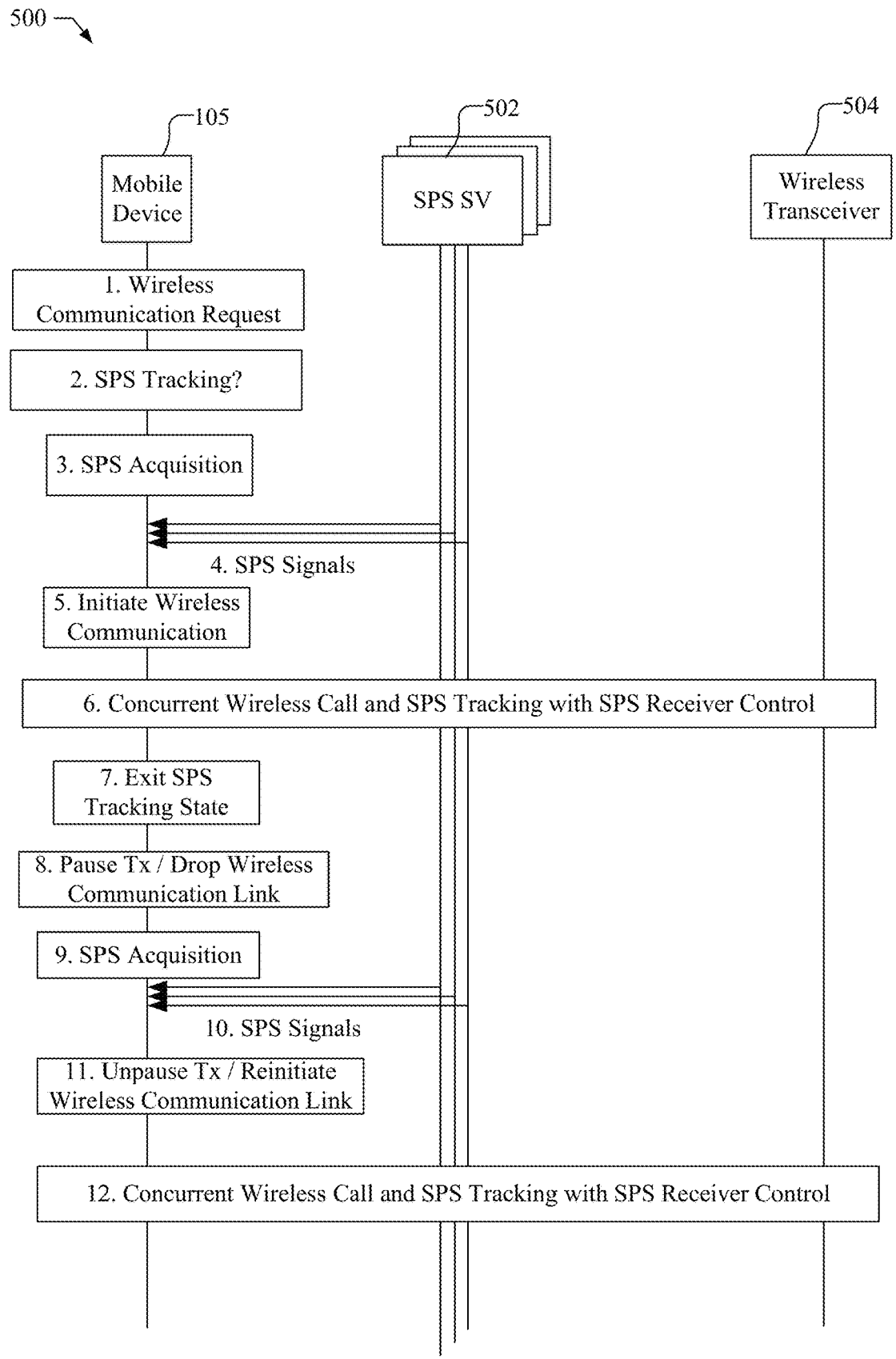
FIG. 5 is a signal flow illustrating concurrent reception of SPS signals and transmission of wireless communication signals by a mobile device.

FIG. 5 is a signal flow 500 illustrating concurrent performance of reception of SPS signals and transmission of wireless communication signals by mobile device 105, SPS satellite vehicles (SVs) 502 and a wireless transceiver 504. The SPS SVs 502, for example, may be satellites in any SPS network, such as satellites 112, 114, and 116 shown in FIG. 1. The wireless transceiver 504 may be part of any wireless communication network and may be, by way of example, one of satellite 122, base station 126 or access point 130.

At stage 1, the mobile device 105 may detect a request for wireless communication, e.g., with wireless transceiver 504. The request, for example, may originate from the mobile device 105 or may originate from the wireless transceiver 504.

At stage 2, the mobile device 105 may determine whether the SPS receiver is in a tracking state, i.e., whether SPS have been acquired and are being tracked by the SPS receiver. If the SPS receiver is in a tracking state, stages 3-5 may be skipped.

At stage 3, assuming the SPS receiver is not in a tracking state, the mobile device 105 begins SPS acquisition, during which SPS signals are acquired and tracked by the SPS receiver. The SPS acquisition procedure may include a timeout, e.g., in the eventuality that the SPS signals cannot be acquired within a reasonable amount of time, e.g., 4 seconds or any desired amount of time.

At stage 4, the mobile device 105 receives SPS signals from SPS SVs 502, e.g., during SPS acquisition. It should be understood that the SPS SVs 502 may continually transmit SPS signals, which once acquired by the mobile device 105 may continue to track.

At stage 5, the mobile device 105 may begin the wireless communication with the wireless transceiver 504 once the SPS signals have been acquired and are being tracked by the SPS receiver (or after the timeout period). As discussed above, if SPS acquisition times out, before completing the SPS acquisition, the SPS acquisition process may continue after initiation of the wireless communications, e.g., using SPS signals on a non-interfered frequency band, or using signal blanking or dwell alignment for SPS signals on an interfered frequency band.

At stage 6, the mobile device 105 and wireless transceiver 504 are engaged in wireless communications concurrently with SPS tracking. The SPS receiver is controlled to mitigate interference caused by wireless transmissions by the mobile device 105. For example, the SPS receiver may be controlled to perform signal blanking, measurement exclusion, reception disablement when uplink signals in frequency bands that are interfered with are transmitted by the mobile device 105, while continuing to receive SPS signals. The SPS receiver, for example, may determine the position of the mobile device 105 using the SPS signals while the mobile device 105 is engaged in wireless communications with the wireless transceiver 504.

At stage 7, the mobile device 105 may determine that the SPS receiver has exited the SPS tracking state, e.g., due to blockage conditions that may prevent the SPS receiver from detecting SPS signals for a period of time.

At stage 8, the mobile device 105 may pause any further uplink signal transmissions or may alternatively drop the wireless communication link.

At stage 9, the mobile device 105 begins SPS acquisition, during which SPS signals are acquired and tracked by the SPS receiver, similar to stage 3. The SPS acquisition procedure may include a timeout.

At stage 10, the mobile device 105 receives SPS signals from SPS SVs 502, e.g., during SPS acquisition. It should be understood that the SPS SVs 502 may continually transmit SPS signals, which once acquired by the mobile device 105 may continue to track.

At stage 11, once the SPS signals have been re-acquired and are being tracked by the SPS receiver, the mobile device 105 may restart the uplink signal transmissions or may alternatively reinitiate the wireless communication link.

At stage 12, the mobile device 105 and wireless transceiver 504 may again engage in wireless communications concurrently with SPS tracking. As in stage 6, the SPS receiver may be controlled to mitigate interference caused by wireless transmissions by the mobile device 105. The SPS receiver, for example, may determine the position of the mobile device 105 using the SPS signals while the mobile device 105 is engaged in wireless communications with the wireless transceiver 504.

Figure 6:
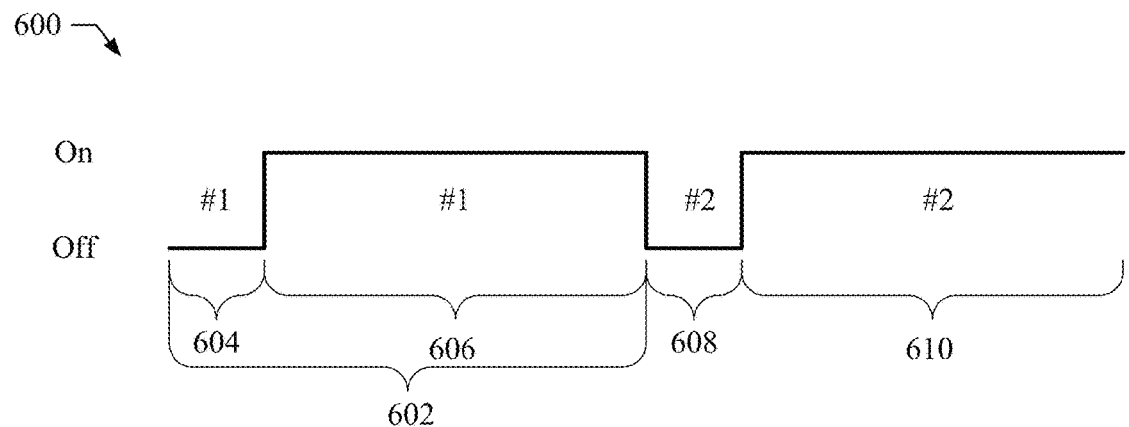
FIG. 6 is a block diagram illustrating a transmission active indicator that may be provided by a wireless transmitter to indicate the start of an uplink signal transmission.

FIG. 6 illustrates an example of a transmission active indicator 600 that may be provided by a wireless transmitter 402 in the mobile device 105 to indicate the start of an uplink signal transmission. As illustrated, the transmission active indicator 600 may indicate the off duration of the wireless communication signal transmission with a low signal and the on duration of the wireless communication signal transmission with a high signal. The wireless communication signal transmission may be periodic with a period 602 that may be, e.g., 2.56 s for a satellite communication transmission, or any other length. FIG. 6 illustrates two cycles of the wireless communication signal transmissions, labeled #1 and #2. As further illustrated in FIG. 6, the off duration may be different than the on duration. For example, in some implementations, the off duration may be 0.56 s and the on duration may be 2.0 s, e.g., for satellite communication transmissions, although other durations may be used.

It should be understood that the transmission active indicator may have other waveforms than shown in FIG. 6. For example, the transmission active indicator may simply indicate the beginning of each cycle, e.g., the beginning of an off duration of the wireless communication signal transmissions, with a pulse, so that the measurement dwell time may be aligned with the off duration of the wireless communication signal transmission. The SPS receiver, for example, may be aware of the duty cycle of the wireless communication signal transmissions and, thus, may not need a waveform indicating the transition from the off duration to the on duration. Further, if the wireless transmitter clock and SPS receiver clock are synchronized, the transmission active indicator may indicate the beginning of an off period of the wireless communication signal transmissions for a single cycle, and the SPS receiver may determine the beginning of each subsequent off period based on the known duty cycle and the SPS receiver clock.

The duty cycle of the wireless communication signal transmissions may be provided in a separate signal provided to the SPS receiver in addition to the transmission active indicator. In some implementations, the SPS receiver may determine the duty cycle based on the transmission active indicator itself, for example, based on the off duration and on duration in the first cycle. In other implementations, the mobile device 105 may be pre-configured with the duty cycle of the wireless communication signal transmissions, which may be stored in memory.

During the transmission off period 604 in cycle #1, the SPS receiver 406 may perform measurement of the Band 1 signals received on Band 1 Rx input, e.g., for the configured measurement dwell time. The measurement dwell time may be constrained based on the off period 604 and may be aligned with the off period 604 so that SPS signals are not measured during the on period 606. The measurement dwell time may start later than the beginning of the off period 604 in order to align the dwell time with the received SPS signal. For example, in the case of GPS L1, the dwell should be aligned with the 20 ms bit period, which may be slightly different for each satellite. For other signal types that use pilot signals, it may be possible to more closely align all the dwell times with the start of the off period. In some implementations, the SPS signal data measured during period 604 may be stored in memory to be processed at a later time. In another implementation, the measurement dwell time may not be pre-configured, instead, the SPS receiver may measure SPS signals until the transmission active indicator 600 transitions high, indicating the on period of the wireless communications signals. The SPS receiver may eliminate or ignore the last coherent integration interval or any coherent integration interval that coincides with the transmission active indicator transitioning to high. In another implementation, the SPS receiver 406 may configure the measurement dwell time to include Band 1 signals before or after the off period 604. The SPS receiver 406 may signal blank Band 1 signals received before or after the off period 604, e.g., during the on period 606. The SPS receiver 406 may include blanked signals in the measurement operation, wherein the blanked signals do not contribute substantially to the measurement results, and report a time stamp associated with the measurement that effectively aligns the measurement dwell time with the off period 604. In some implementations, multiple measurement dwells may be performed during period 604 to obtain multiple position calculations, e.g., for semiautonomous or autonomous vehicles.

During the communication signal transmission on period 606 in cycle #1, the Band 1 signals received on Band 1 Rx input are ignored by the SPS receiver 406 and are not processed. If the SPS signal data measured during period 604 is stored in memory, the SPS signal data may be processed during period 606. For example, the SPS signal data stored in memory may be played back to correlator hardware in the measurement engine 408, such that measurement processing can be performed while the wireless transmitter is active. This optimizes the usage of the correlator and other hardware resources at the expense of memory for signal storage.

During the transmission off period 608 in cycle #2, the SPS receiver 406 may perform measurement of the Band 1 signals received on Band 1 Rx input for the configured measurement dwell time. Similar to period 604, the measurement dwell time may be configured to be equal to or less than the off period 608 and is aligned with the off period 608 so that SPS signals are not measured during the on period 610. In some implementations, the SPS signal data measured during period 604 may be stored in memory to be processed at a later time. Additionally, the SPS receiver 406 may perform non-coherent integration during period 608 with the SPS signals measurement results from period 604. In some implementations, multiple measurement dwells may be performed during period 608 to obtain multiple position calculations, e.g., for semiautonomous or autonomous vehicles.

During the signal transmission on period 610 in cycle #2, the Band 1 signals received on Band 1 Rx input may be ignored by the SPS receiver 406 and are not processed. If the SPS signal data measured during period 608 is stored in memory, the SPS signal data may be processed, e.g., played back to correlator hardware, such that measurement processing can be performed while the wireless transmitter is active.

The process may continue until the wireless communication signal transmissions stop.

The Band 1 signals, which are interfered with by the wireless communication signal transmissions, may be more suitable for signal acquisition than the Band 2 signals that are not interfered with by signal transmissions. Accordingly, the Band 1 signals received using measurement dwell times aligned with off periods of the wireless communication signal transmissions may be used for an acquisition procedure. The Band 2 signals may be ignored during signal acquisition, or may be used for decoding time. Once the signal acquisition procedure is complete, both the Band 1 and Band 2 signals may be used for SPS tracking, e.g., with continued use of measurement dwell times aligned with the off periods of the wireless communication signal transmissions for the Band 1 signals.

Figures 7A, 7B:
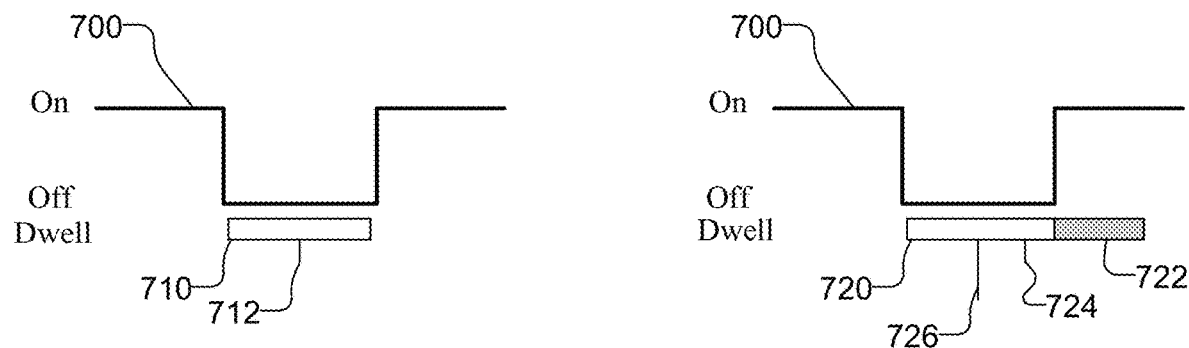
FIGS. 7A and 7B illustrate different measurement dwell alignments with respect to an off period of the wireless transmitter.

FIGS. 7A and 7B illustrate different measurement dwell alignments with respect to an off period of the wireless transmitter. FIGS. 7A and 7B both illustrate a portion of a transmission active indicator 700 indicating the off duration of the wireless communication signal transmission with a low signal and the on duration of the wireless communication signal transmission with a high signal. FIGS. 7A and 7B both also illustrate the times of measurement dwells 710 and 720, respectively.

FIG. 7A illustrates a measurement dwell time 710 that is actually aligned with the off duration of the wireless transmitter, i.e., the measurement dwell time 710 is limited to the off duration and does not include any portion of the on duration. It should be understood, however, that the measurement dwell time 710 may begin after the off duration starts and may end before the off duration stops. The SPS receiver 406 may include a time stamp indicating a time of applicability of each measurement dwell. Because the measurement dwell time 710 does not include a portion of the on duration of the wireless transmitter, the time of applicability for the measurement dwell is middle 712 of the measurement dwell time 710.

FIG. 7B, on the other hand, illustrates a measurement dwell time 720 that is effectively aligned with the off duration of the wireless transmitter. As illustrated in FIG.

7B, the measurement dwell time 720 may extend into at least a portion of the on duration of the wireless transmitter, e.g., after or before the off duration. The SPS receiver 406 may blank signals that are received during the on duration of the wireless transmitter, indicated as portion 722 of the measurement dwell time 720. The SPS receiver 406 may include blanked signals in the measurement operation, which do not contribute in a substantial way to the measurement results because the signals are blanked. As illustrated, however, the middle 724 of the measurement dwell time 720 is not an accurate representation of time of applicability of the measurement dwell time 720 because the middle 724 is based on the portion 722 of the measurement dwell time 720, which does not contribute to the measurement results. The SPS receiver 406, accordingly, may assign to the measurement results a time of applicability 726 that is based on the off duration of the wireless signal transmissions. Thus, the measurement dwell time may be effectively aligned with the off duration of the uplink signal transmission by reporting a measurement time stamp for the measurement operation that is based on the off duration of the uplink signal transmission.

It should be understood that in some cases, there may be latency or error in the determined on/off times of the uplink signal transmission, causing the measurement dwell time 710 or 720 to be slightly longer than the uplink transmission on time, and/or causing a small portion of interfered signal to not be blanked. This may cause some degradation in performance, depending on how much interfered signal is actually used for measurement, but if the extension of the measurement dwell time 710 or 720 into the uplink transmission on time is small, the degradation in performance may be within a desired tolerance. Accordingly, the measurement dwell time 710 (or 720) may be longer than the uplink transmission on time and/or may be aligned (or effectively aligned) with the off duration of the uplink signal transmission such that the measurement dwell time 710 (or 720) extends slightly into (before and/or after) at least a portion of the on duration of the wireless transmitter, e.g., if the degradation in performance is within desired tolerance.

Figure 8:
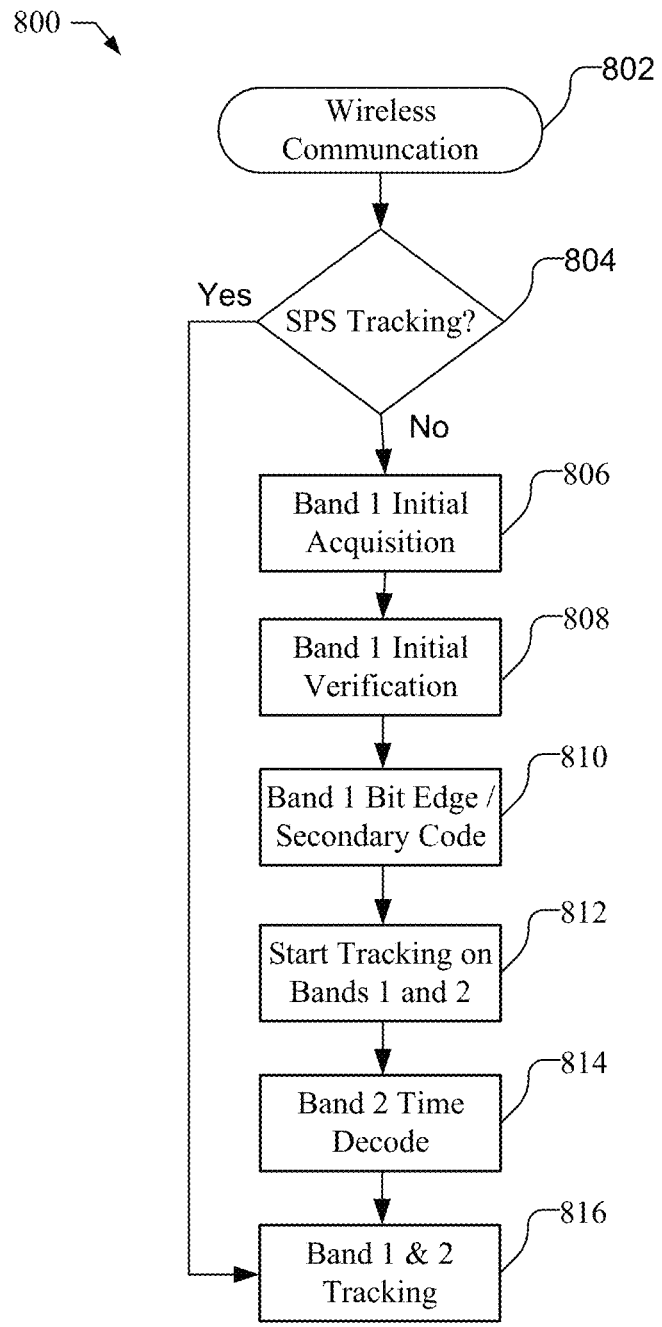
FIG. 8 is a flow chart illustrating multiband SPS procedures that are performed concurrently with wireless transmissions, including acquisition and tracking.

FIG. 8 is a flow chart illustrating multiband SPS procedures 800 that are performed concurrently with wireless transmissions, including acquisition and tracking. During both acquisition and tracking, SPS signals are received in the first frequency band, Band 1, using measurement dwell times aligned with the off durations of the wireless communication signal transmission, as discussed above. In some implementations, Band 2 signals may be received during the on durations or the on and off durations of the wireless communication signal transmissions and used for one or more acquisition operations.

At block 802, the mobile device 105 is engaged in a wireless communication with a wireless transceiver, such as with one of satellite 122, base station 126, access point 130, a peer device, etc.

At decision 804, the mobile device 105 determines whether the SPS receiver is performing SPS tracking, i.e., is in a tracking state. If the SPS receiver is already in a tracking state, signal acquisition is not necessary, and the process may flow to block 816. If the SPS receiver is not in a tracking state, the mobile device 105 begins an acquisition phase. Acquisition, for example, involves identifying satellites that are visible to the SPS receiver and that can be used to provide navigation information. Other than the use of measurement dwell times aligned with the off durations of the wireless communication signal transmission, as discussed above, a conventional signal acquisition procedure may be used.

At block 806, an initial acquisition is performed using SPS signals received in the first frequency band, Band 1, e.g., the SPS signals received on the Band 1 Rx input of SPS receiver 406 shown in FIG. 3. The Band 1 signals may be acquired using a relatively large correlation window in frequency and time domains with a relatively high probability of false alarm (Pfa). The correlation window depends on the time and frequency uncertainties. The initial acquisition may be performed during a first set of one or more consecutive off periods of the wireless communication signal transmissions.

At block 808, a verification of the signals acquired in block 806 may be performed. Verification of the Band 1 signals uses a relatively small search window in frequency and time domains with a relatively low Pfa. Compared to the measurement operation used for acquisition in block 806, the verification measurement operation has a smaller correlation window and a detection threshold with a smaller probability of false detection (Pfa). The verification operation may also have longer non-coherent integration period than used in the initial acquisition. The verification may be performed during a second set of one or more consecutive off periods of the wireless communication signal transmissions. In some implementations, e.g., where multiple measurement dwells are included within a single off duration of the wireless transmission, the verification operation may be performed in the same off duration as the initial acquisition performed in block 806. If the initial acquisition at block 806 has the desired Pfa, verification of the signals at block 808 may be skipped.

At block 810, after the verification operation, the SPS receiver may perform at least one of bit edge detection or secondary code synchronization operation or a combination thereof using the Band 1 signals in one or more subsequent wireless transmitter off periods. Non-coherent integration may be used to combine results from more than one off period. If the time uncertainty is below a threshold, block 810 may be skipped and the process may go to block 816.

At block 812, the SPS receiver may begin tracking of SPS signals on both Band 1 and Band 2, i.e., the frequency band that is not interfered with by the wireless communication signal transmissions and that may be received on Band 2 Rx input of the SPS receiver 406. For example, the SPS receiver may use the acquisition results from the Band 1 signal to initiate a tracking procedure on the Band 2 signals which are interfered by the wireless transmitter. The tracking of the SPS signals on both Band 1 and Band 2 may continue to use a relatively large search space due to the time uncertainty. Tracking of Band 1 signals uses measurement dwell times that are aligned with the off durations of the wireless communication signal transmissions, while tracking may of Band 2 signals operates continuously, i.e., during both the off and on durations of the wireless communication signal transmissions.

At block 814, the Band 2 data signals may be received continuously during on and off periods of the wireless transmitter and enabling it to synchronize to the broadcast data stream and decode time parameters in the SPS signals. For example, the band 2 data signals may be used to decode the Time of Week (TOW) parameter broadcast by GPS satellites. Knowledge of the time parameter allows the SPS receiver to reduce the time uncertainty and collapse the search space used for tracking both the Band 1 signals and the Band 2 signals. At this stage, the SPS receiver may exit the acquisition state. If the time uncertainty is below a threshold, block 814 may be skipped and the process may go to block 816 without waiting for the time parameter to be decoded.

At block 816, the SPS receiver enters a tracking state, during which both Band 1 and Band 2 may be tracked using a relatively small search space. Tracking of Band 1 signals uses measurement dwell times that are aligned with the off durations of the wireless communication signal transmissions, while tracking of Band 2 signals may operate continuously, i.e., during both the off and on durations of the wireless communication signal transmissions. In some implementations, tracking of Band 2 signals may be performed only during the on durations of the wireless communication signal transmissions, and the SPS receiver may switch to track Band 1 signals during the off durations of the wireless communication signal transmissions. If the SPS receiver exits the tracking state, e.g., due to failing to receive SPS signals for a period of time for example because of blockage conditions, the SPS receiver may reenter the acquisition state.

Figure 9:
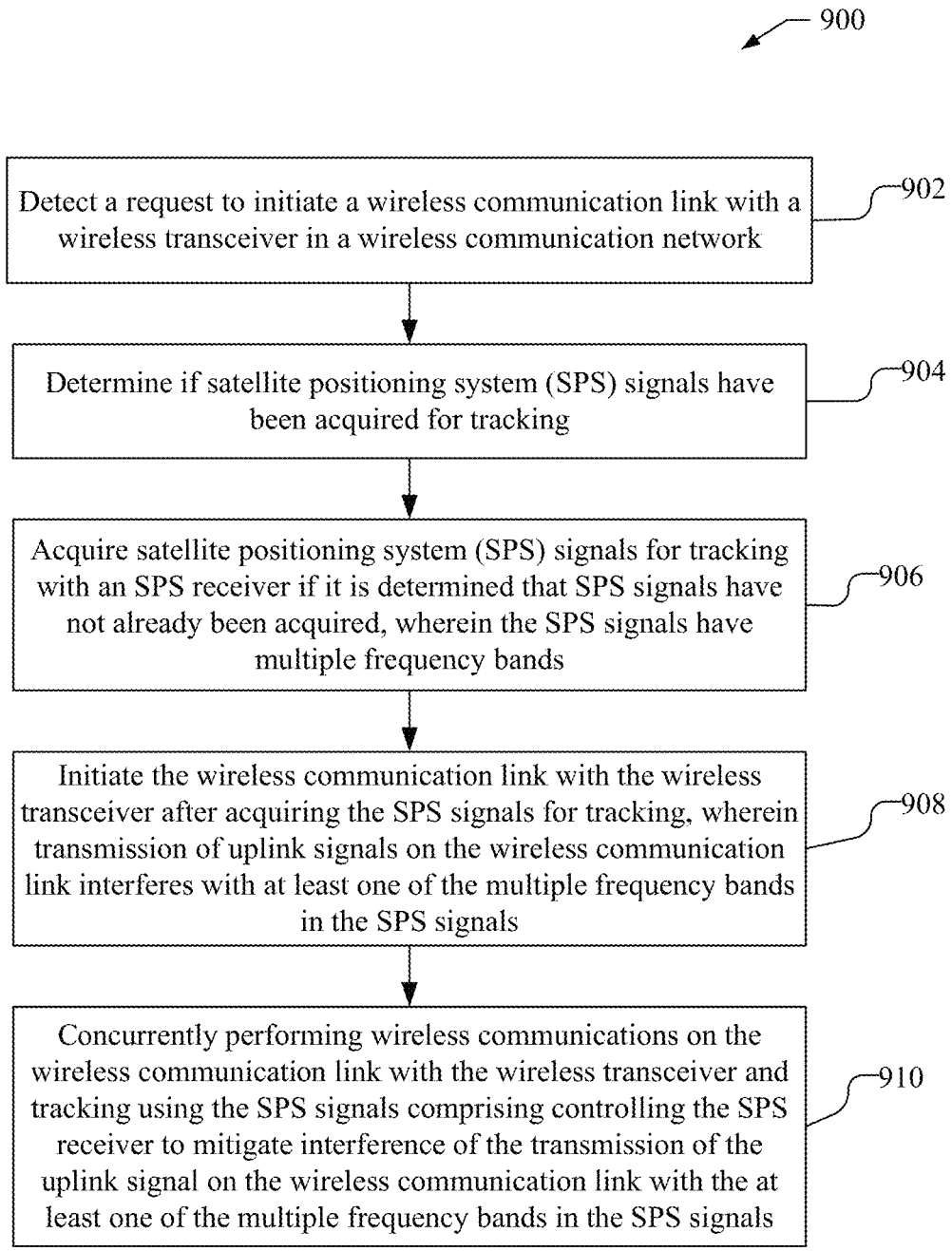
FIG. 9 is a flowchart for an exemplary method for supporting concurrent engagement in wireless communications and satellite positioning system (SPS) tracking performed by a mobile device.

FIG. 9 shows a flowchart for an exemplary method 900 for supporting concurrent operation of wireless communications and satellite positioning system (SPS) tracking performed by a mobile device, such as mobile device 105.

At block 902, the mobile device detects a request to initiate a wireless communication link with a wireless transceiver in a wireless communication network, for example, as discussed at block 302 in FIG. 3A and stage 1 of FIG. 5. For example, a request for initiation of a wireless communication may be received, e.g., from the mobile device 105 or from an external entity.

At block 904, the mobile device may determine if satellite positioning system (SPS) signals have been acquired for tracking, e.g., as discussed at block 304 in FIG. 3A and stage 2 of FIG. 5. At block 906, satellite positioning system (SPS) signals are acquired for tracking with an SPS receiver if it is determined that SPS signals have not already been acquired, wherein the SPS signals have multiple frequency bands, e.g., as discussed at block 306 in FIG. 3A and stages 3 and 4 of FIG. 5. If it is determined that SPS have already been acquired, block 906 may not be performed. At block 908, the wireless communication link is initiated with the wireless transceiver, wherein transmission of uplink signals on the wireless communication link interferes with at least one of the multiple frequency bands in the SPS signals, e.g., as discussed at block 310 in FIG. 3A and stage 5 of FIG. 5. At block 910, the mobile device concurrently performs wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals, e.g., as discussed at block 310 in FIG. 3A and stage 6 of FIG. 5.

In one implementation, the request to initiate the wireless communication link may originate from the mobile device, e.g., as discussed at block 302 in FIG. 3A and stage 1 of FIG. 5. In another implementation, the request to initiate the wireless communication link may originate from the wireless transceiver, e.g., as discussed at block 302 in FIG. 3A and stage 1 of FIG. 5.

In one implementation, the acquiring the SPS signals for tracking is not performed when it is determined that SPS signals have already been acquired, e.g., as discussed at block 302 in FIG. 3A and stage 1 of FIG. 5.

In one implementation, the SPS signals may be acquired for tracking by performing an SPS acquisition procedure that times out before completion, and completing the SPS acquisition procedure after initiating the wireless communication link using SPS signals in a first frequency band that is interfered with by the transmission of uplink signals, wherein only SPS signals that are received while no uplink signals are transmitted are used for acquisition, or using SPS signals in a second frequency band that is not interfered with by the transmission of uplink signals, e.g., as discussed at block 312 in FIG. 3A. The information from the SPS acquisition procedure before the SPS acquisition procedure times out may be used with the SPS acquisition procedure after initiating the wireless communication link, e.g., as discussed at block 312 in FIG. 3A.

In one implementation, the SPS receiver may be controlled to blank received SPS signals in the at least one of the multiple frequency bands while transmitting the uplink signals on the wireless communication link to mitigate the interference, e.g., as discussed at block 310 in FIG. 3A and stage 6 of FIG. 5.

In one implementation, the SPS receiver may be controlled to exclude SPS signals in the at least one of the multiple frequency bands received while transmitting the uplink signals on the wireless communication link from position calculations to mitigate the interference, e.g., as discussed at block 310 in FIG. 3A and stage 6 of FIG. 5.

In one implementation, the SPS receiver may be controlled to disable reception of SPS signals in the at least one of the multiple frequency bands while transmitting the uplink signals on the wireless communication link to mitigate the interference, e.g., as discussed at block 310 in FIG. 3A and stage 6 of FIG. 5.

In one implementation, the multiple frequency bands may include a first frequency band that is interfered with by the transmission of the uplink signals and a second frequency band that is not interfered with by the transmission of the uplink signals, wherein the first frequency band is used for acquiring the SPS signals for tracking with the SPS receiver, and the second frequency band is used for tracking, e.g., as discussed at FIG. 2, and blocks 306 and 310 in FIG. 3A and stage 6 of FIG. 5. For example, the first frequency band may be an L1 band and the second frequency band may comprise one or more of an L2 band and an L5 band, e.g., as discussed at FIG. 2.

In one implementation, the at least one of the multiple frequency bands that is interfered with by the transmission of the uplink signals may be at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal, e.g., as discussed at FIG. 2.

In one implementation, the mobile device may determine the SPS receiver has exited a tracking state and is not tracking the SPS signals, e.g., as discussed at block 324 in FIG. 3B and block 344 in FIG. 3C and stage 7 of FIG. 5. The mobile device may stop transmissions of the uplink signals on the wireless communication link, e.g., as discussed at block 326 in FIG. 3B and block 346 in FIG. 3C and stage 8 of FIG. 5. The SPS signals may be re-acquired for tracking while transmissions of the uplink signals are stopped, e.g., as discussed at block 328 in FIG. 3B and block 306 in FIG. 3A and stages 9 and 10 of FIG. 5. The mobile device 105 may start transmissions of the uplink signals on the wireless communication link after the SPS signals are re-acquired, e.g., as discussed at block 330 in FIG. 3B and block 310 in FIG. 3A and stage 11 of FIG. 5. For example, stopping transmissions of the uplink signals may include dropping the wireless communication link, and starting transmissions of the uplink signals on the wireless communication link after the SPS signals are re-acquired may include re-initiating the wireless communication link, e.g., as discussed at blocks 346 in FIG. 3C and block 310 in FIG. 3A and stages 8 and 11 of FIG. 5.

In one implementation, the wireless transceiver may be a satellite vehicle in a satellite communication system, e.g., as illustrated in FIG. 1 and discussed in FIG. 5. In another implementation, the wireless transceiver may be a terrestrial base station in a Radio Access Technology (RAT), e.g., as illustrated in FIG. 1 and discussed in FIG. 5.

Figure 10:
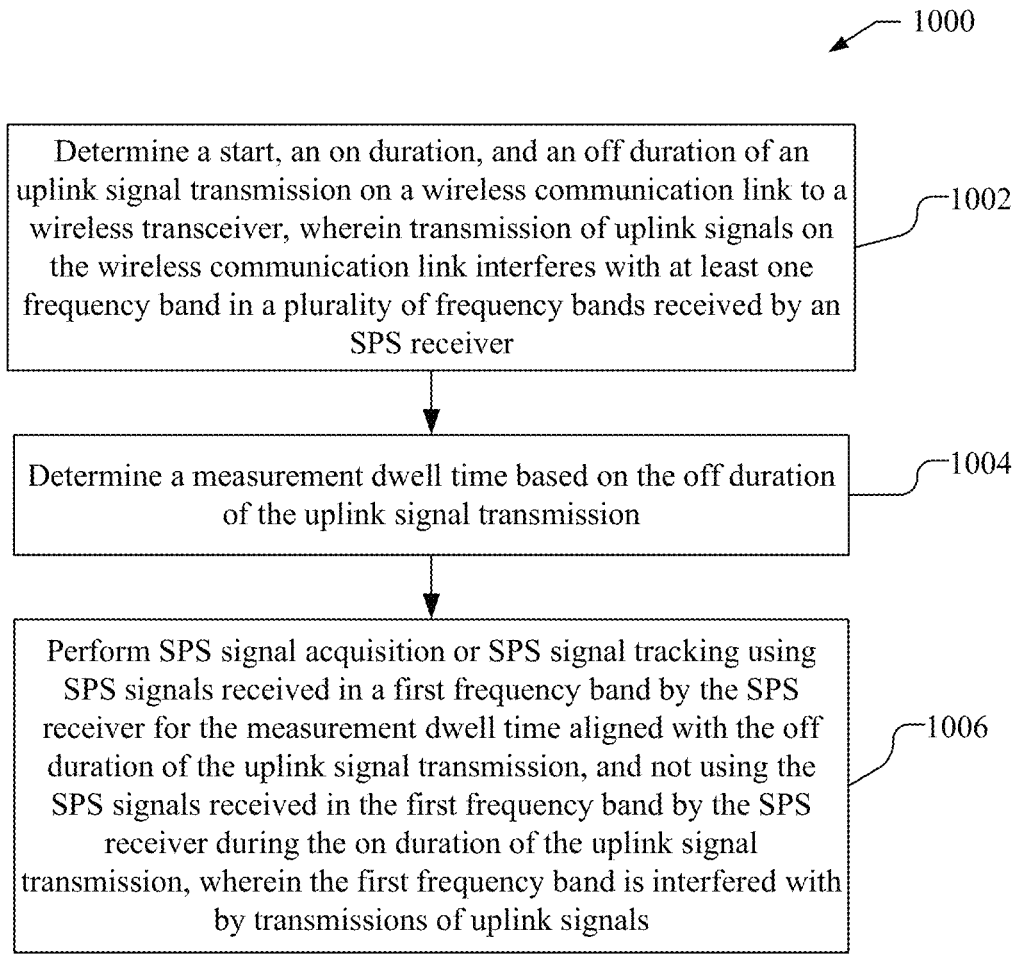
FIG. 10 is a flowchart for an exemplary method for supporting concurrent engagement in wireless communications and satellite positioning system (SPS) operation performed by a mobile device.

FIG. 10 shows a flowchart for an exemplary method 1000 for supporting concurrent performance of wireless communications and satellite positioning system (SPS) operation performed by a mobile device, such as mobile device 105.

At block 1002, the mobile device determines a start, an on duration, and an off duration of an uplink signal transmission on a wireless communication link to a wireless transceiver, wherein transmission of uplink signals on the wireless communication link interferes with at least one frequency band in a plurality of frequency bands received by an SPS receiver, for example, as discussed in FIGS. 4 and 6. For example, the start, on duration, and off duration of the uplink signal transmission may be determined based on the transmission active indicator signal provided by wireless transmitter 402 and received by the SPS receiver 406 in FIG. 4 and discussed in 6.

At block 1004, a measurement dwell time is determined based on the off duration of the uplink signal transmission, e.g., as discussed in FIGS. 4 and 6. For example, the SPS receiver 406 may configure the measurement dwell time to be equal to or less than the off duration of the wireless communication signal transmission determined from the transmission active indicator signal, e.g., as discussed in FIGS. 4 and 6 and illustrated in FIGS. 5A and 5B. The SPS receiver 406, in another example, may configure the measurement dwell time to be more than the off duration of the wireless communication signal transmission, as discussed in FIG. 4. The measurement dwell time may be a total integration time based on a product of a coherent integration interval and a number of non-coherents, and the number of coherents may be selected to produce a total integration time that is equal to or less than the off duration.

At block 1006, SPS signal acquisition or SPS signal tracking are performed using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals, e.g., as discussed in FIG. 4 and in reference to off duration periods 604, 608 and on duration periods 606 and 610 in FIG. 6.

In one implementation, the SPS signals received in the first frequency band by the SPS receiver during the on duration of the uplink signal transmission are blanked, and SPS signals received during the off duration and blanked SPS signals received during the on duration are used in a measurement operation, and wherein the measurement dwell time is effectively aligned with the off duration of the uplink signal transmission by reporting a measurement time stamp for the measurement operation that is based on the off duration of the uplink signal transmission, e.g., as discussed in FIGS. 4, 6, 7A, and 7B.

In one implementation, an amount of the measurement dwell time extends into the on duration of the uplink signal during which the SPS signals received in the first frequency band by the SPS receiver are not blanked, the amount of the measurement dwell time that extends into the on duration of the uplink signal is constrained based on a desired tolerance of the performance of the SPS signal acquisition or the SPS signal tracking, e.g., as discussed in reference to FIGS. 7A and 7B.

In one implementation, the measurement dwell time may be constrained to be less than or equal to the off duration of the uplink signal transmission, e.g., as illustrated in FIG. 7A. The measurement dwell time may be a total integration time that is a product of a coherent integration interval and a number of non-coherents, e.g., as discussed in FIGS. 4 and 6. For example, the measurement dwell time may be constrained based on the off duration of the uplink signal transmission by adjusting the number of non-coherents, e.g., as discussed in FIG. 6.

In one implementation, performing the SPS signal acquisition or tracking using the SPS signals received in the first frequency band may include measuring by the SPS receiver for a plurality of measurement dwell times within a single off duration of the uplink signal transmission, e.g., as discussed in FIG. 4 and in reference to off duration periods 604, 608 in FIG. 6.

In one implementation, the mobile device is in one of a semiautonomous vehicle or an autonomous vehicle comprising one of an aerial vehicle or ground vehicle, e.g., as discussed in FIG. 1 and in reference to the off duration periods 604, 608 in FIG. 6.

In one implementation, the mobile device may store SPS signal data measured during the off duration of the uplink signal transmission, e.g., as discussed in reference to the off duration periods 604, 608 in FIG. 6. The SPS signal data may be processed during the on duration of the uplink signal transmission, e.g., as discussed in reference to the on duration periods 606, 610 in FIG. 6.

In one implementation, non-coherent integration with SPS signals received in the first frequency band by the SPS receiver is performed across consecutive off durations of the uplink signal transmission, e.g., as discussed in reference to the off duration periods 604, 608 in FIG. 6.

In one implementation, the SPS signal acquisition may include one or more of an initial acquisition of SPS signals in the first frequency band, verification of SPS signals in the first frequency band, and at least one of signal bit edge alignment and secondary code alignment or a combination thereof, e.g., as discussed in blocks 802, 804, 806, 808, and 810 of FIG. 8.

In one implementation, the mobile device may further measure SPS signals received in a second frequency band by the SPS receiver, wherein the second frequency band is not interfered with by transmissions of uplink signals, e.g., as discussed in FIGS. 4 and 6. The SPS signal data measured in the second frequency band may be processed during the SPS signal acquisition, e.g., as discussed in block 814 of FIG. 8.

In one implementation, the mobile device may measure SPS signals received in a second frequency band by the SPS receiver, wherein the second frequency band is not interfered with by transmissions of uplink signals, wherein SPS signal data measured in the first frequency band during the off duration of the uplink signal transmission and SPS signal data measured in the second frequency band are used for the SPS signal tracking, as discussed in bock 816 of FIG. 8. For example, the SPS signals received in the second frequency band by the SPS receiver may be measured during only the on duration of the uplink signal transmission or during both the off duration and the on duration of the uplink signal transmission. The first frequency band may be in an L1 band and the second frequency band may be in one or more of an L2 band and an L5 band, e.g., as discussed in FIG. 2.

In one implementation, the SPS signals received in the first frequency band may be at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal, e.g., as discussed in FIG. 2.

In one implementation, the wireless transceiver may be a satellite vehicle in a satellite communication system, e.g., as discussed in FIG. 1. In another implementation, the wireless transceiver is a terrestrial base station in a Radio Access Technology (RAT), e.g., as discussed in FIG. 1.

Figure 11:
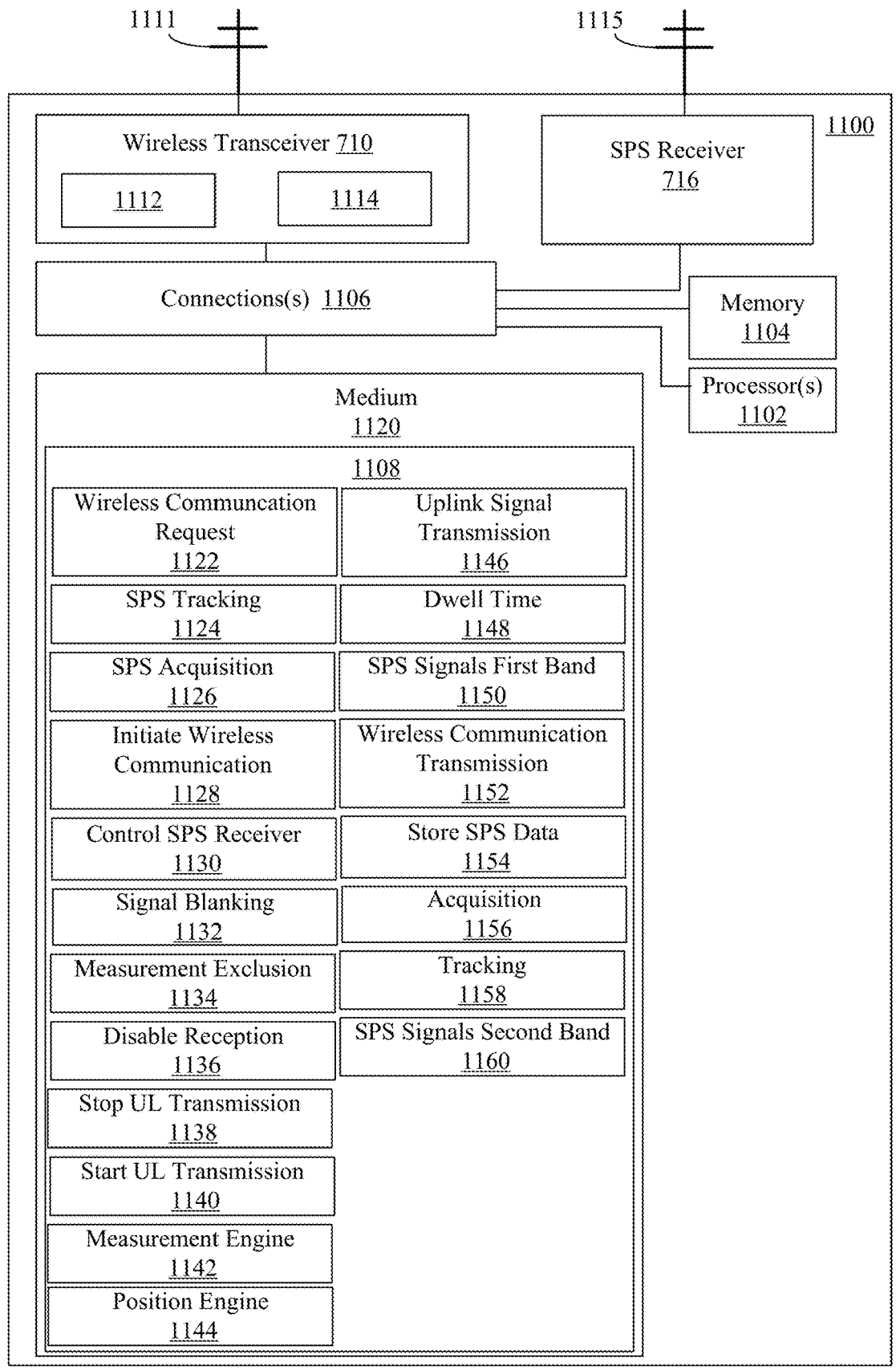
FIG. 11 is a schematic block diagram illustrating certain exemplary features of a mobile device enabled to support concurrent engagement in wireless communications and satellite positioning system (SPS) tracking.

FIG. 11 shows a schematic block diagram illustrating certain exemplary features of a mobile device 1100, e.g., which may be mobile device 105 shown in FIG. 1, enabled to support concurrent performance of in wireless communications and satellite positioning system (SPS) operations, such as acquisition and tracking, according to the disclosure herein. Mobile device 1100 may, for example, include one or more processors 1102, memory 1104, an external interface such as a wireless transceiver 1110, and an SPS receiver 1116, which may be operatively coupled with one or more connections 1106 (e.g., buses, lines, fibers, links, etc.) to non-transitory computer readable medium 1120 and memory 1104. The mobile device 1100 may further include additional items, which are not shown, such as a user interface that may include e.g., a display, a keypad or other input device, such as virtual keypad on the display, through which a user may interface with the mobile device, or a satellite positioning system receiver. In certain example implementations, all or part of mobile device 1100 may take the form of a chipset, and/or the like. Wireless transceiver 1110 may, for example, include a transmitter 1112 enabled to transmit one or more signals over one or more types of wireless communication networks and a receiver 1114 to receive one or more signals transmitted over the one or more types of wireless communication networks, and may be configured for various communication protocols/standards, such as satellite communications, 5G NR, LTE, Wi-Fi, etc. The transmission of uplink signals by the transmitter 1112 may interfere with at least one frequency band in the SPS signals received by the SPS receiver 1116. The SPS receiver 1116 may receive SPS signals with multiple frequency bands and of various satellite position signaling standards, such as Global Positioning System (GPS), Global Navigation Satellite System (GLONASS), Galileo, BeiDou, and/or other type of satellite positioning system. The SPS receiver 1116 may include a measurement engine and a position engine, or one or more of the measurement engine and position engine may be implemented by the one or more processors 1102, e.g., implementing one or more instructions or program code 1108 on a non-transitory computer readable medium, such as medium 1120 and/or memory 1104.

In some embodiments, mobile device 1100 may include one or more antennas 1111 and 1115, which may be internal or external. Antenna 1111 may be used to transmit and/or receive signals processed by wireless transceiver 1110. In some embodiments, mobile device antenna 1111 may be coupled to wireless transceiver 1110. In some embodiments, measurements of signals received (transmitted) by mobile device 1100 may be performed at the point of connection of the mobile device antenna 1111 and wireless transceiver 1110. For example, the measurement point of reference for received (transmitted) RF signal measurements may be an input (output) terminal of the receiver 1114 (transmitter 1112) and an output (input) terminal of the mobile device antenna 1111. In a mobile device 1100 with multiple mobile device antennas 1111 or antenna arrays, the antenna connector may be viewed as a virtual point representing the aggregate output (input) of multiple mobile device antennas. Antenna 1115 may be coupled to SPS receiver 1116 and may be used to receive SPS signals on multiple frequency bands. In some embodiments, measurements of SPS signals received by mobile device 1100 may be performed at the point of connection of the antenna 1115 and SPS receiver 1116.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of mobile device 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in mobile device 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in mobile device 1100 is merely exemplary, and as such the functionality of the modules and/or data structures may be combined, separated, and/or be structured in different ways depending upon the implementation of the mobile device 1100.

The medium 1120 and/or memory 1104 may include a wireless communication request module 1122 that when implemented by the one or more processors 1102 configures the one or more processors 1102 to determine when a request has been received to initiate a wireless communication link with a wireless transceiver, such as a communication satellite, base station, or access point. The request, for example, may originate within the mobile device 1100, e.g., from an internal application or user interaction, or may originate from an external wireless transmitter, received, e.g., through the wireless transceiver 1110.

The medium 1120 and/or memory 1104 may include an SPS tracking module 1124 that when implemented by the one or more processors 1102 configures the one or more processors 1102 to determine if the SPS receiver 1116 has acquired SPS signals and is in a tracking state. For example, determination if the SPS receiver 1116 is in a tracking state may be based a tracking state indicator signal provided by the SPS receiver 1116, or based on a determination by the one or more processors 1102 when the one or more processors 1102 serve as a measurement engine and/or position engine for the SPS receiver 1116.

The medium 1120 and/or memory 1104 may include an SPS acquisition module 1126 that when implemented by the one or more processors 1102 configures the one or more processors 1102 to cause the SPS receiver 1116 to acquire and track SPS signals, e.g., when it is determined that the SPS signals have not already been acquired and are being tracked.

The medium 1120 and/or memory 1104 may include an initiate wireless communication module 1128 that when implemented by the one or more processors 1102 configures the one or more processors 1102 to cause the wireless transceiver 1110 to initiate a wireless communication link with a wireless transmitter, e.g., after acquiring the SPS signals for tracking or after the SPS acquisition times out.

The medium 1120 and/or memory 1104 may include a control SPS receiver module 1130 that when implemented by the one or more processors 1102 configures the one or more processors 1102 to control the SPS receiver 1116 to mitigate any interference caused by the transmission of the uplink signals via the wireless transmitter 1112 and SPS signals received by the SPS receiver 1116. For example, the one or more processors 1102 may control cause a transmission active indication to be provided to the SPS receiver 1116 to measurement engine functions or position engine functions in the one or more processors 1102 when UL signals are being transmitted by the wireless transmitter 1112.

The medium 1120 and/or memory 1104 may include a signal blanking module 1132 that when implemented by the one or more processors 1102 configures the one or more processors 1102 to replacing received SPS signals with a zero signal or fixed sequence whenever the wireless transmitter 1112 is active, e.g., if the measurement engine function is performed in the one or more processors 1102.

The medium 1120 and/or memory 1104 may include a measurement exclusion module 1134 that when implemented by the one or more processors 1102 configures the one or more processors 1102 to exclude SPS signals received whenever the wireless transmitter 1112 is active from position measurements, e.g., if the position engine function is performed in the one or more processors 1102. The SPS signals to be excluded may be identified by the SPS receiver 1116 or by the one or more processors 1102 implementing the control SPS receiver module 1130.

The medium 1120 and/or memory 1104 may include a disable reception module 1136 that when implemented by the one or more processors 1102 configures the one or more processors 1102 to cause the SPS receiver 1116 to disable reception of SPS signals whenever the wireless transmitter 1112 is active in frequency bands in which interference occurs.

The medium 1120 and/or memory 1104 may include a stop uplink transmission module 1138 that when implemented by the one or more processors 1102 configures the one or more processors 1102 to cause the wireless transmitter 1112 to pause or stop UL transmissions, e.g., when the SPS receiver 1116 is no longer tracking SPS signals. In some implementations, the one or more processors 1102 may be configured to drop the wireless communication link.

The medium 1120 and/or memory 1104 may include a start uplink transmission module 1140 that when implemented by the one or more processors 1102 configures the one or more processors 1102 to cause the wireless transmitter 1112 to start UL transmissions, e.g., when the SPS receiver 1116 has acquired and is tracking SPS signals. In some implementations, the one or more processors 1102 may be configured to re-initiate the wireless communication link.

The medium 1120 and/or memory 1104 may include a measurement engine module 1142 that when implemented by the one or more processors 1102 configures the one or more processors 1102 to perform measurement functions for the SPS receiver 1116.

The medium 1120 and/or memory 1104 may include a position engine module 1144 that when implemented by the one or more processors 1102 configures the one or more processors 1102 to perform positioning functions using SPS signals received by the SPS receiver 1116.

The medium 1120 and/or memory 1104 may include an uplink signal transmission module 1146 that when implemented by the one or more processors 1102 configures the one or more processors 1102 to determine a start, an on duration, and an off duration of an uplink signal transmission on a wireless link to a wireless transceiver. For example, the start of uplink signal transmission may be determined based on a transmission active indicator signal provided by the wireless transmitter 1112 and the on duration, and an off duration of an uplink signal transmission may be determined based on another signal provided with the transmission active indicator signal, or the transmission active indicator signal itself, or may be preconfigured and stored in memory 1104.

The medium 1120 and/or memory 1104 may include a dwell time module 1148 that when implemented by the one or more processors 1102 configures the one or more processors 1102 to constrain the measurement dwell time for SPS signals based on the off duration of the uplink signal transmission. For example, the measurement dwell time may be a total integration time based on a product of a coherent integration interval and a number of non-coherents, where the number of non-coherents may be adjusted so that the measurement dwell time is less than or equal to the off duration of the uplink signal transmission. The dwell time module 1148 may constrain the measurement dwell time to be short enough that the SPS signals may be measured multiple times within a single wireless communication transmission off period.

The medium 1120 and/or memory 1104 may include an SPS signals first band module 1150 that when implemented by the one or more processors 1102 configures the one or more processors 1102 to cause the SPS receiver 1116 to measure SPS signals received in a first frequency band, which is interfered with by transmissions of uplink signals, for the measurement dwell time aligned with the off duration of the uplink signal transmission and to not measure the SPS signals received in the first frequency band during the on duration of the uplink signal transmission. In some implementations, multiple measurements may be performed within a single wireless communication transmission off period. Further, in some implementations, non-coherent integration may be performed using SPS signals received over multiple consecutive wireless communication transmission off periods.

The medium 1120 and/or memory 1104 may include a wireless communication transmission module 1152 that when implemented by the one or more processors 1102 configures the one or more processors 1102 to cause the wireless transmitter 1112 to provide a transmission active indicator signal to indicate the start of transmission of uplink signals.

The medium 1120 and/or memory 1104 may include a store SPS data module 1154 that when implemented by the one or more processors 1102 configures the one or more processors 1102 to store SPS data measured during a wireless communication transmission off period in memory 1104 for later processing.

The medium 1120 and/or memory 1104 may include an acquisition module 1156 that when implemented by the one or more processors 1102 configures the one or more processors 1102 to perform an acquisition procedure using the SPS signals measured in the first frequency band during dwell times aligned with the wireless communication transmission off period. The acquisition procedure, for example, may include one or more of an initial acquisition of SPS signals in the first frequency band, verification of SPS signals in the first frequency band, and at least one of signal bit edge alignment and secondary code alignment or a combination thereof. The acquisition procedure may further include decoding time using SPS signals received in a second frequency band, which is not interfered with by the wireless communication transmissions.

The medium 1120 and/or memory 1104 may include a tracking module 1158 that when implemented by the one or more processors 1102 configures the one or more processors 1102 to track SPS signals measured in the first frequency band during dwell times aligned with the wireless communication transmission off period and SPS signals measured in a second frequency band, which is not interfered with by the wireless communication transmissions and which may be measured during the off and on periods of the wireless communication transmission.

The medium 1120 and/or memory 1104 may include a SPS signals second band module 1160 that when implemented by the one or more processors 1102 configures the one or more processors 1102 to cause the SPS receiver 1116 to measure SPS signals received in a second frequency band, which is not interfered with by transmissions of uplink signals and which may be measured during the off and on periods of the wireless communication transmission.

The medium 1120 and/or memory 1104 may include a measurement engine module 1138 that when implemented by the one or more processors 1102 configures the one or more processors 1102 to perform measurement functions for the SPS receiver 1116.

The medium 1120 and/or memory 1104 may include a position engine module 1140 that when implemented by the one or more processors 1102 configures the one or more processors 1102 to perform positioning functions using SPS signals received by the SPS receiver 1116.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support concurrent engagement of wireless communications and SPS tracking, in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a wireless transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

In one implementation, a mobile device, such as mobile device 1100, may be configured to support concurrent operation of wireless communications and satellite positioning system (SPS) tracking. The mobile device may include a means for detecting a request to initiate a wireless communication link with a wireless transceiver in a wireless communication network, which may be, e.g., the wireless transceiver 1110 and one or more processors 1102 with dedicated hardware or implementing executable code or software instructions in memory 1104 and/or medium 1120 such as the wireless communication request module 1122. A means for determining if satellite positioning system (SPS) signals have been acquired for tracking may be, e.g., may be, e.g., the SPS receiver 1116 and one or more processors 1102 with dedicated hardware or implementing executable code or software instructions in memory 1104 and/or medium 1120 such as the SPS tracking module 1124. A means for acquiring SPS signals for tracking with an SPS receiver when it is determined that SPS signals have not already been acquired, wherein the SPS signals have multiple frequency bands may be, e.g., the SPS receiver 1116 and one or more processors 1102 with dedicated hardware or implementing executable code or software instructions in memory 1104 and/or medium 1120 such as the SPS acquisition module 1126. A means for initiating the wireless communication link with the wireless transceiver, wherein transmission of uplink signals on the wireless communication link interferes with at least one of the multiple frequency bands in the SPS signals may be, e.g., the wireless transceiver 1110 and one or more processors 1102 with dedicated hardware or implementing executable code or software instructions in memory 1104 and/or medium 1120 such as the initiate wireless communication module 1128. A means for concurrently performing wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals may be, e.g., the wireless transceiver 1110 and SPS receiver 1116 and one or more processors 1102 with dedicated hardware or implementing executable code or software instructions in memory 1104 and/or medium 1120 such as the control SPS receiver module 1130.

In one implementation, the mobile device may further include a means for blanking received SPS signals in the at least one of the multiple frequency bands while transmitting the uplink signals on the wireless communication link to mitigate the interference, which may be, e.g., the SPS receiver 1116 and one or more processors 1102 with dedicated hardware or implementing executable code or software instructions in memory 1104 and/or medium 1120 such as the control SPS receiver module 1130 and signal blanking module 1132.

In one implementation, the mobile device may further include a means for excluding SPS signals in the at least one of the multiple frequency bands received while transmitting the uplink signals on the wireless communication link from position calculations to mitigate the interference, which may be, e.g., the SPS receiver 1116 and one or more processors 1102 with dedicated hardware or implementing executable code or software instructions in memory 1104 and/or medium 1120 such as the control SPS receiver module 1130 and the measurement exclusion module 1134.

In one implementation, the mobile device may further include a means for disabling reception of SPS signals in the at least one of the multiple frequency bands while transmitting the uplink signals on the wireless communication link to mitigate the interference, which may be, e.g., the SPS receiver 1116 and one or more processors 1102 with dedicated hardware or implementing executable code or software instructions in memory 1104 and/or medium 1120 such as the control SPS receiver module 1130 and the disable reception module 1136.

In one implementation, the mobile device may further include a means determining the SPS receiver has exited a tracking state and is not tracking the SPS signals, which may be, e.g., the SPS receiver 1116 and one or more processors 1102 with dedicated hardware or implementing executable code or software instructions in memory 1104 and/or medium 1120 such as the SPS tracking module 1124. A means for stopping transmissions of the uplink signals on the wireless communication link may be, e.g., the SPS receiver 1116 and one or more processors 1102 with dedicated hardware or implementing executable code or software instructions in memory 1104 and/or medium 1120 such as the stop uplink transmission module 1138. A means for re-acquiring the SPS signals for tracking while transmissions of the uplink signals are stopped may be, e.g., the SPS receiver 1116 and one or more processors 1102 with dedicated hardware or implementing executable code or software instructions in memory 1104 and/or medium 1120 such as the SPS acquisition module 1126. A means for starting transmissions of the uplink signals on the wireless communication link after the SPS signals are re-acquired may be, e.g., the SPS receiver 1116 and one or more processors 1102 with dedicated hardware or implementing executable code or software instructions in memory 1104 and/or medium 1120 such as the start uplink transmission module 1140.

In one implementation, a mobile device, such as mobile device 1100, may be configured to support concurrent performance of wireless communications and satellite positioning system (SPS) operation. The mobile device may include a means for determining a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver, which may be, e.g., the wireless transceiver 1110, SPS receiver 1116, and one or more processors 1102 with dedicated hardware or implementing executable code or software instructions in memory 1104 and/or medium 1120 such as the uplink signal transmission module 1146 and wireless communication transmission module 1152. A means for determining a measurement dwell time based on the off duration of the uplink signal transmission may be, e.g., the one or more processors 1102 with dedicated hardware or implementing executable code or software instructions in memory 1104 and/or medium 1120 such as the dwell time module 1148. A means for performing SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals may be, e.g., the SPS receiver 1116, and one or more processors 1102 with dedicated hardware or implementing executable code or software instructions in memory 1104 and/or medium 1120 such as the SPS signals first band module 1150, the acquisition module 1156, and the tracking module 1158.

In one implementation, the mobile device may include a means for storing SPS signal data measured during the off duration of the uplink signal transmission, which may be, e.g., the SPS receiver 1116, memory 1104, and one or more processors 1102 with dedicated hardware or implementing executable code or software instructions in memory 1104 and/or medium 1120 such as the store SPS data module 1154. A means for processing the SPS signal data during the on duration of the uplink signal transmission may be, e.g., the SPS receiver 1116, and one or more processors 1102 with dedicated hardware or implementing executable code or software instructions in memory 1104 and/or medium 1120 such as the SPS signals first band module 1150 and the measurement engine module 1138.

In one implementation, the mobile device may include a means for performing non-coherent integration with SPS signals received in the first frequency band by the SPS receiver across consecutive off durations of the uplink signal transmission, which may be the SPS receiver 1116 and one or more processors 1102 with dedicated hardware or implementing executable code or software instructions in memory 1104 and/or medium 1120 such as the SPS signals first band module 1150.

In one implementation, the mobile device may include a means for measuring SPS signals received in a second frequency band by the SPS receiver during both the off duration and the on duration of the uplink signal transmission, wherein the second frequency band is not interfered with by transmissions of uplink signals, which may be the SPS receiver 1116 and one or more processors 1102 with dedicated hardware or implementing executable code or software instructions in memory 1104 and/or medium 1120 such as the SPS signals second band module 1160. A means for processing SPS signal data measured in the second frequency band to decode time may be the SPS receiver 1116 and one or more processors 1102 with dedicated hardware or implementing executable code or software instructions in memory 1104 and/or medium 1120 such as the SPS signals first band module 1150 and the acquisition module 1156.

In one implementation, the mobile device may include a means for measuring SPS signals received in a second frequency band by the SPS receiver during both the off duration and the on duration of the uplink signal transmission, wherein the second frequency band is not interfered with by transmissions of uplink signals, wherein SPS signal data measured in the first frequency band during the off duration of the uplink signal transmission and SPS signal data measured in the second frequency band are used for the SPS signal tracking, which may be the SPS receiver 1116 and one or more processors 1102 with dedicated hardware or implementing executable code or software instructions in memory 1104 and/or medium 1120 such as the SPS signals second band module 1160, and the tracking module 1158.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

A satellite-based positioning system typically includes a system of transmitters positioned to enable entities to determine their position on or above the Earth based, at least in part, on signals received from the transmitters. Such a transmitter typically transmits a signal marked with a repeating pseudo-random noise (PN) code. In a particular example, such transmitters may be located on Earth orbiting space vehicles (SV). For example, an SV in a constellation of Global Navigation Satellite System (GNSS) such as Global Positioning System GPS, Global Navigation Satellite System (GLONASS), etc. may transmit a signal marked with a PN code that is distinguishable from PN codes transmitted by other SVs in the constellation.

In accordance with certain aspects, the techniques presented herein are not restricted to global systems (e.g., GNSS). For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, etc., and/or various augmentation systems (e.g., a Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit GNSS and/or GNSS-like signals that may also be interfered with by certain wireless communication signals, etc. Thus, as used herein, an SPS may include any combination of one or more global and/or regional navigation satellite systems and/or augmentation systems.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Implementation examples are described in the following numbered clauses:

Clause 1. A method performed by a mobile device for supporting concurrent operation of wireless communications and satellite positioning system (SPS) tracking, the method comprising:
detecting a request to initiate a wireless communication link with a wireless transceiver in a wireless communication network;
determining if satellite positioning system (SPS) signals have been acquired for tracking;
acquiring SPS signals for tracking with an SPS receiver when it is determined that SPS signals have not already been acquired, wherein the SPS signals have multiple frequency bands;
initiating the wireless communication link with the wireless transceiver, wherein transmission of uplink signals on the wireless communication link interferes with at least one of the multiple frequency bands in the SPS signals; and
concurrently performing wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals.

Clause 2. The method of clause 1, wherein the request to initiate the wireless communication link originates from the mobile device.

Clause 3. The method of clause 1, wherein the request to initiate the wireless communication link originates from the wireless transceiver.

Clause 4. The method of any of clauses 1-3, wherein the acquiring the SPS signals for tracking is not performed when it is determined that SPS signals have already been acquired.

Clause 5. The method of any of clauses 1-4, wherein the acquiring the SPS signals for tracking comprises performing an SPS acquisition procedure that times out before completion, and completing the SPS acquisition procedure after initiating the wireless communication link using SPS signals in a first frequency band that is interfered with by the transmission of uplink signals, wherein only SPS signals that are received while no uplink signals are transmitted are used for acquisition, or using SPS signals in a second frequency band that is not interfered with by the transmission of uplink signals.

Clause 6. The method of clause 5, wherein information from the SPS acquisition procedure before the SPS acquisition procedure times out is used with the SPS acquisition procedure after initiating the wireless communication link.

Clause 7. The method of any of clauses 1-6, wherein controlling the SPS receiver comprises blanking received SPS signals in the at least one of the multiple frequency bands while transmitting the uplink signals on the wireless communication link to mitigate the interference.

Clause 8. The method of any of clauses 1-6, wherein controlling the SPS receiver comprises excluding SPS signals in the at least one of the multiple frequency bands received while transmitting the uplink signals on the wireless communication link from position calculations to mitigate the interference.

Clause 9. The method of any of clauses 1-6, wherein controlling the SPS receiver comprises disabling reception of SPS signals in the at least one of the multiple frequency bands while transmitting the uplink signals on the wireless communication link to mitigate the interference.

Clause 10. The method of any of clauses 1-9, wherein the multiple frequency bands comprise a first frequency band that is interfered with by the transmission of the uplink signals and a second frequency band that is not interfered with by the transmission of the uplink signals, wherein the first frequency band is used for acquiring the SPS signals for tracking with the SPS receiver, and the second frequency band is used for tracking.

Clause 11. The method of clause 10, wherein the first frequency band is in an L1 band and the second frequency band comprises one or more of an L2 band and an L5 band.

Clause 12. The method of any of clauses 1-11, wherein the at least one of the multiple frequency bands that is interfered with by the transmission of the uplink signals comprises at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal.

Clause 13. The method of any of clauses 1-12, further comprising:
determining the SPS receiver has exited a tracking state and is not tracking the SPS signals;
stopping transmissions of the uplink signals on the wireless communication link;
re-acquiring the SPS signals for tracking while transmissions of the uplink signals are stopped;
starting transmissions of the uplink signals on the wireless communication link after the SPS signals are re-acquired.

Clause 14. The method of clause 13, wherein stopping transmissions of the uplink signals comprises dropping the wireless communication link, and starting transmissions of the uplink signals on the wireless communication link after the SPS signals are re-acquired comprises re-initiating the wireless communication link.

Clause 15. The method of any of clauses 1-14, wherein the wireless transceiver is a satellite vehicle in a satellite communication system.

Clause 16. The method of any of clauses 1-14, wherein the wireless transceiver is a terrestrial base station in a Radio Access Technology (RAT).

Clause 17. A mobile device configured to support concurrent operation of wireless communications and satellite positioning system (SPS) tracking, the mobile device comprising:
a satellite positioning system (SPS) receiver configured to receive SPS signals over multiple frequency bands;
a wireless transmitter configured to transmit uplink signals in a wireless communication link with a wireless transceiver in a wireless communication network;
at least one memory;
at least one processor coupled to the SPS receiver, the wireless transmitter, and the at least one memory and configured to:
detect a request to initiate the wireless communication link with the wireless transceiver in the wireless communication network;
determine if the SPS receiver has acquired SPS signals for tracking;
cause the SPS receiver to acquire SPS for tracking when it is determined that SPS signals have not already been acquired, wherein the SPS signals have multiple frequency bands;
initiate the wireless communication link with the wireless transceiver via the wireless transmitter, wherein transmission of the uplink signals on the wireless communication link interferes with at least one of the multiple frequency bands in the SPS signals; and
concurrently perform wireless communications on the wireless communication link with the wireless transceiver and tracking the SPS signals by being configured to control the SPS receiver to mitigate interference of the transmission of the uplink signals on the wireless communication link with the at least one of the multiple frequency bands in the SPS signals.

Clause 18. The mobile device of clause 17, wherein the request to initiate the wireless communication link originates from the mobile device.

Clause 19. The mobile device of clause 17, wherein the request to initiate the wireless communication link originates from the wireless transceiver.

Clause 20. The mobile device of any of clauses 17-19, wherein the SPS receiver is not caused to acquire the SPS signals for tracking when it is determined that SPS signals have already been acquired.

Clause 21. The mobile device of any of clauses 17-20, wherein the at least one processor is configured to acquire the SPS signals for tracking by being configured to perform an SPS acquisition procedure that times out before completion, and to complete the SPS acquisition procedure after initiating the wireless communication link using SPS signals in a first frequency band that is interfered with by the transmission of uplink signals, wherein only SPS signals that are received while no uplink signals are transmitted are used for acquisition, or using SPS signals in a second frequency band that is not interfered with by the transmission of uplink signals.

Clause 22. The mobile device of clause 21, wherein information from the SPS acquisition procedure before the SPS acquisition procedure times out is used with the SPS acquisition procedure after initiating the wireless communication link.

Clause 23. The mobile device of any of clauses 17-22, wherein the SPS receiver mitigates the interference by blanking received SPS signals in the at least one of the multiple frequency bands while the wireless transmitter transmits the uplink signals on the wireless communication link.

Clause 24. The mobile device of any of clauses 17-22, wherein the SPS receiver mitigates the interference by excluding SPS signals in the at least one of the multiple frequency bands received while transmitting the uplink signals on the wireless communication link from position calculations.

Clause 25. The mobile device of any of clauses 17-22, wherein the SPS receiver mitigates the interference by disabling reception of SPS signals in the at least one of the multiple frequency bands while the wireless transmitter transmits the uplink signals on the wireless communication link.

Clause 26. The mobile device of any of clauses 17-25, wherein the multiple frequency bands comprise a first frequency band that is interfered with by the transmission of the uplink signals and a second frequency band that is not interfered with by the transmission of the uplink signals, wherein the first frequency band is used for acquiring the SPS signals for tracking with the SPS receiver, and the second frequency band is used for tracking.

Clause 27. The mobile device of clause 26, wherein the first frequency band is in an L1 band and the second frequency band comprises one or more of an L2 band and an L5 band.

Clause 28. The mobile device of any of clauses 17-27, wherein the at least one of the multiple frequency bands that is interfered with by the transmission of the uplink signals comprises at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal.

Clause 29. The mobile device of any of clauses 17-28, wherein the at least one processor is further configured to:
determine that the SPS receiver has exited a tracking state and is not tracking the SPS signals;
stop the wireless transmitter from transmitting uplink signals on the wireless communication link;
cause the SPS receiver to re-acquire the SPS signals for tracking while transmissions of the uplink signals are stopped; and
cause the wireless transmitter to start transmitting uplink signals on the wireless communication link after the SPS signals are re-acquired.

Clause 30. The mobile device of clause 29, wherein the at least one processor is configured to stop the wireless transmitter from transmitting uplink signals by being configured to drop the wireless communication link, and to cause the wireless transmitter to start transmitting uplink signals on the wireless communication link after the SPS signals are re-acquired by being configured to re-initiate the wireless communication link.

Clause 31. The mobile device of any of clauses 17-30, wherein the wireless transceiver is a satellite vehicle in a satellite communication system.

Clause 32. The mobile device of any of clauses 17-30, wherein the wireless transceiver is a terrestrial base station in a Radio Access Technology (RAT).

Clause 33. A mobile device configured to support concurrent operation of wireless communications and satellite positioning system (SPS) tracking, the mobile device comprising:
means for detecting a request to initiate a wireless communication link with a wireless transceiver in a wireless communication network;
means for determining if satellite positioning system (SPS) signals have been acquired for tracking;
means for acquiring SPS signals for tracking with an SPS receiver when it is determined that SPS signals have not already been acquired, wherein the SPS signals have multiple frequency bands;
means for initiating the wireless communication link with the wireless transceiver, wherein transmission of uplink signals on the wireless communication link interferes with at least one of the multiple frequency bands in the SPS signals; and
means for concurrently performing wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals.

Clause 34. The mobile device of clause 33, wherein the request to initiate the wireless communication link originates from the mobile device.

Clause 35. The mobile device of clause 33, wherein the request to initiate the wireless communication link originates from the wireless transceiver.

Clause 36. The mobile device of any of clauses 33-35, wherein the acquiring the SPS signals for tracking is not performed when it is determined that SPS signals have already been acquired.

Clause 37. The mobile device of any of clauses 33-36, wherein the means for acquiring the SPS signals for tracking performs an SPS acquisition procedure that times out before completion, and completes the SPS acquisition procedure after initiating the wireless communication link using SPS signals in a first frequency band that is interfered with by the transmission of uplink signals, wherein only SPS signals that are received while no uplink signals are transmitted are used for acquisition, or using SPS signals in a second frequency band that is not interfered with by the transmission of uplink signals.

Clause 38. The mobile device of clause 37, wherein information from the SPS acquisition procedure before the SPS acquisition procedure times out is used with the SPS acquisition procedure after initiating the wireless communication link.

Clause 39. The mobile device of any of clauses 33-38, further comprising means for blanking received SPS signals in the at least one of the multiple frequency bands while transmitting the uplink signals on the wireless communication link to mitigate the interference.

Clause 40. The mobile device of any of clauses 33-38, further comprising means for excluding SPS signals in the at least one of the multiple frequency bands received while transmitting the uplink signals on the wireless communication link from position calculations to mitigate the interference.

Clause 41. The mobile device of any of clauses 33-38, further comprising means for disabling reception of SPS signals in the at least one of the multiple frequency bands while transmitting the uplink signals on the wireless communication link to mitigate the interference.

Clause 42. The mobile device of any of clauses 33-41, wherein the multiple frequency bands comprise a first frequency band that is interfered with by the transmission of the uplink signals and a second frequency band that is not interfered with by the transmission of the uplink signals, wherein the first frequency band is used for acquiring the SPS signals for tracking with the SPS receiver, and the second frequency band is used for tracking.

Clause 43. The mobile device of clause 42, wherein the first frequency band is in an L1 band and the second frequency band comprises one or more of an L2 band and an L5 band.

Clause 44. The mobile device of any of clauses 33-43, wherein the at least one of the multiple frequency bands that is interfered with by the transmission of the uplink signals comprises at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal.

Clause 45. The mobile device of any of clauses 33-44, further comprising:
means for determining the SPS receiver has exited a tracking state and is not tracking the SPS signals;
means for stopping transmissions of the uplink signals on the wireless communication link;
means for re-acquiring the SPS signals for tracking while transmissions of the uplink signals are stopped; and
means for starting transmissions of the uplink signals on the wireless communication link after the SPS signals are re-acquired.

Clause 46. The mobile device of clause 45, wherein stopping transmissions of the uplink signals comprises dropping the wireless communication link, and starting transmissions of the uplink signals on the wireless communication link after the SPS signals are re-acquired comprises re-initiating the wireless communication link.

Clause 47. The mobile device of any of clauses 33-46, wherein the wireless transceiver is a satellite vehicle in a satellite communication system.

Clause 48. The mobile device of any of clauses 33-46, wherein the wireless transceiver is a terrestrial base station in a Radio Access Technology (RAT).

Clause 49. A non-transitory storage medium including program code stored thereon, the program code is operable to configure at least one processor in a mobile device to support concurrent operation of wireless communications and satellite positioning system (SPS) tracking, the program code comprising instructions to:
detect a request to initiate a wireless communication link with a wireless transceiver in a wireless communication network;
determine if satellite positioning system (SPS) signals have been acquired for tracking;
acquire SPS signals for tracking with an SPS receiver when it is determined that SPS signals have not already been acquired, wherein the SPS signals have multiple frequency bands;
initiate the wireless communication link with the wireless transceiver, wherein transmission of uplink signals on the wireless communication link interferes with at least one of the multiple frequency bands in the SPS signals; and concurrently perform wireless communications on the wireless communication link with the wireless transceiver and tracking the SPS signals comprising controlling the SPS receiver to mitigate interference of the transmission of the uplink signals on the wireless communication link with the at least one of the multiple frequency bands in the SPS signals.

Clause 50. The non-transitory storage medium of clause 49, wherein the request to initiate the wireless communication link originates from the mobile device.

Clause 51. The non-transitory storage medium of clause 49, wherein the request to initiate the wireless communication link originates from the wireless transceiver.

Clause 52. The non-transitory storage medium of any of clauses 49-51, wherein the program code to acquire the SPS signals for tracking does not cause the SPS signals to be acquired when it is determined that SPS signals have already been acquired.

Clause 53. The non-transitory storage medium of any of clauses 49-52, wherein the program code to acquire the SPS signals for tracking comprises instructions to perform an SPS acquisition procedure that times out before completion, and to complete the SPS acquisition procedure after initiating the wireless communication link using SPS signals in a first frequency band that is interfered with by the transmission of uplink signals, wherein only SPS signals that are received while no uplink signals are transmitted are used for acquisition, or using SPS signals in a second frequency band that is not interfered with by the transmission of uplink signals.

Clause 54. The non-transitory storage medium of clause 53, wherein information from the SPS acquisition procedure before the SPS acquisition procedure times out is used with the SPS acquisition procedure after initiating the wireless communication link.

Clause 55. The non-transitory storage medium of any of clauses 49-54, wherein the program code further comprises instructions to control the SPS receiver by blanking received SPS signals in the at least one of the multiple frequency bands while transmitting the uplink signals on the wireless communication link to mitigate the interference.

Clause 56. The non-transitory storage medium of any of clauses 49-54, wherein the program code further comprises instructions to control the SPS receiver by excluding SPS signals in the at least one of the multiple frequency bands received while transmitting the uplink signals on the wireless communication link from position calculations to mitigate the interference.

Clause 57. The non-transitory storage medium of any of clauses 49-54, wherein the program code further comprises instructions to control the SPS receiver by disabling reception of SPS signals in the at least one of the multiple frequency bands while transmitting the uplink signals on the wireless communication link to mitigate the interference.

Clause 58. The non-transitory storage medium of any of clauses 49-57, wherein the multiple frequency bands comprise a first frequency band that is interfered with by the transmission of the uplink signals and a second frequency band that is not interfered with by the transmission of the uplink signals, wherein the first frequency band is used for acquiring the SPS signals for tracking with the SPS receiver, and the second frequency band is used for tracking.

Clause 59. The non-transitory storage medium of clause 58, wherein the first frequency band is in an L1 band and the second frequency band comprises one or more of an L2 band and an L5 band.

Clause 60. The non-transitory storage medium of any of clauses 49-59, wherein the at least one of the multiple frequency bands that is interfered with by the transmission of the uplink signals comprises at least one of a Galileo E1 signal, a BeiDou (BDS) B1 signal, a BDS B 1C signal, a Global Navigation Satellite System (GLONASS) G1 signal, a GLONASS L1OC signal, a Global Positioning System (GPS) L1, and a GPS L1C signal.

Clause 61. The non-transitory storage medium of any of clauses 49-60, wherein the program code further comprises instructions to:

determine the SPS receiver has exited a tracking state and is not tracking the SPS signals;

stop transmissions of the uplink signals on the wireless communication link;

re-acquire the SPS signals for tracking while transmissions of the uplink signals are stopped; and start transmissions of the uplink signals on the wireless communication link after the SPS signals are re-acquired.

Clause 62. The non-transitory storage medium of clause 61, wherein the instructions to stop transmissions of the uplink signals drops the wireless communication link, and the instructions to starts transmissions of the uplink signals on the wireless communication link after the SPS signals are re-acquired re-initiates the wireless communication link.

Clause 63. The non-transitory storage medium of any of clauses 49-62, wherein the wireless transceiver is a satellite vehicle in a satellite communication system.

Clause 64. The non-transitory storage medium of any of clauses 49-62, wherein the wireless transceiver is a terrestrial base station in a Radio Access Technology (RAT).

Clause 65. A method performed by a mobile device for supporting concurrent performance of wireless communications and satellite positioning system (SPS) operation, the method comprising:

determining a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver;

determining a measurement dwell time based on the off duration of the uplink signal transmission; and performing SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals.

Clause 66. The method of clause 65, wherein the SPS signals received in the first frequency band by the SPS receiver during the on duration of the uplink signal transmission are blanked, and SPS signals received during the off duration and blanked SPS signals received during the on duration are used in a measurement operation, and wherein the measurement dwell time is effectively aligned with the off duration of the uplink signal transmission by reporting a measurement time stamp for the measurement operation that is based on the off duration of the uplink signal transmission.

Clause 67. The method of either of clauses 65 or 66, wherein an amount of the measurement dwell time extends into the on duration of the uplink signal during which the SPS signals received in the first frequency band by the SPS receiver are not blanked, the amount of the measurement dwell time that extends into the on duration of the uplink signal is constrained based on a desired tolerance of the performance of the SPS signal acquisition or the SPS signal tracking.

Clause 68. The method of either of clauses 65 or 66, wherein the measurement dwell time is constrained to be less than or equal to the off duration of the uplink signal transmission.

Clause 69. The method of clause 68, wherein the measurement dwell time is a total integration time comprising a product of a coherent integration interval and a number of non-coherents.

Clause 70. The method of clause 69, wherein constraining the measurement dwell time based on the off duration of the uplink signal transmission comprises adjusting the number of non-coherents.

Clause 71. The method of any of clauses 65-70, wherein performing SPS signal acquisition or tracking using the SPS signals received in the first frequency band by the SPS receiver comprises measuring the SPS signals for a plurality of measurement dwell times within a single off duration of the uplink signal transmission.

Clause 72. The method of any of clauses 65-71, wherein the mobile device is in one of a semiautonomous vehicle or an autonomous vehicle comprising one of an aerial vehicle or ground vehicle.

Clause 73. The method of any of clauses 65-72, further comprising:
storing SPS signal data measured during the off duration of the uplink signal transmission; and
processing the SPS signal data during the on duration of the uplink signal transmission.

Clause 74. The method of any of clauses 65-73, further comprising performing non-coherent integration with SPS signals received in the first frequency band by the SPS receiver across consecutive off durations of the uplink signal transmission.

Clause 75. The method of any of clauses 65-74, wherein the SPS signal acquisition comprises one or more of an initial acquisition of SPS signals in the first frequency band, verification of SPS signals in the first frequency band, and at least one of signal bit edge alignment and secondary code alignment or a combination thereof.

Clause 76. The method of any of clauses 65-75, further comprising:
measuring SPS signals received in a second frequency band by the SPS receiver, wherein the second frequency band is not interfered with by transmissions of uplink signals; and
processing SPS signal data measured in the second frequency band during the SPS signal acquisition.

Clause 77. The method of any of clauses 65-75, further comprising:
measuring SPS signals received in a second frequency band by the SPS receiver, wherein the second frequency band is not interfered with by transmissions of uplink signals; and
wherein SPS signal data measured in the first frequency band during the off duration of the uplink signal transmission and SPS signal data measured in the second frequency band are used for the SPS signal tracking.

Clause 78. The method of clause 77, wherein the SPS signals received in the second frequency band by the SPS receiver are measured during only the on duration of the uplink signal transmission or during both the off duration and the on duration of the uplink signal transmission.

Clause 79. The method of clause 77, wherein the first frequency band is in an L1 band and the second frequency band comprises one or more of an L2 band and an L5 band.

Clause 80. The method of any of clauses 65-79, wherein the SPS signals received in the first frequency band comprises at least one of a Galileo E1 signal, a BeiDou (BDS) B1 signal, a BDS B 1C signal, a Global Navigation Satellite System (GLONASS) G1 signal, a GLONASS L1OC signal, a Global Positioning System (GPS) L1, and a GPS L1C signal.

Clause 81. The method of any of clauses 65-80, wherein the wireless transceiver is a satellite vehicle in a satellite communication system.

Clause 82. The method of any of clauses 65-81, wherein the wireless transceiver is a terrestrial base station in a Radio Access Technology (RAT).

Clause 83. A mobile device configured to support concurrent performance of wireless communications and satellite positioning system (SPS) operation, the mobile device comprising:
a satellite positioning system (SPS) receiver configured to receive SPS signals over multiple frequency bands;
a wireless transmitter configured to transmit uplink signals in a wireless communication link with a wireless transceiver in a wireless communication network;
at least one memory;
at least one processor coupled to the SPS receiver, the wireless transmitter, and the at least one memory and configured to:
determine a start, an on duration, and an off duration of an uplink signal transmission on a wireless link to the wireless transceiver, wherein transmission of uplink signals on the wireless communication link interferes with at least one frequency band in a plurality of frequency bands received by an SPS receiver;
determine a measurement dwell time based on the off duration of the uplink signal transmission; and
perform SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals.

Clause 84. The mobile device of clause 83, wherein the SPS signals received in the first frequency band by the SPS receiver during the on duration of the uplink signal transmission are blanked, and SPS signals received during the off duration and blanked SPS signals received during the on duration are used in a measurement operation, and wherein the measurement dwell time is effectively aligned with the off duration of the uplink signal transmission by reporting a measurement time stamp for the measurement operation that is based on the off duration of the uplink signal transmission.

Clause 85. The mobile device of either of clauses 83 or 84, wherein an amount of the measurement dwell time extends into the on duration of the uplink signal during which the SPS signals received in the first frequency band by the SPS receiver are not blanked, the amount of the measurement dwell time that extends into the on duration of the uplink signal is constrained based on a desired tolerance of the performance of the SPS signal acquisition or the SPS signal tracking.

Clause 86. The mobile device of either of clauses 83 or 84, wherein the measurement dwell time is constrained to be less than or equal to the off duration of the uplink signal transmission.

Clause 87. The mobile device of clause 86, wherein the measurement dwell time is a total integration time comprising a product of a coherent integration interval and a number of non-coherents.

Clause 88. The mobile device of clause 87, wherein the at least one processor is configured to constrain the measurement dwell time based on the off duration of the uplink signal transmission by being configured to adjust the number of non-coherents.

Clause 89. The mobile device of any of clauses 83-88, wherein the at least one processor is configured to perform SPS signal acquisition or tracking using the SPS signals received in the first frequency band by the SPS receiver by being configured to measure the SPS signals for a plurality of measurement dwell times within a single off duration of the uplink signal transmission.

Clause 90. The mobile device of any of clauses 83-89, wherein the mobile device is in one of a semiautonomous vehicle or an autonomous vehicle comprising one of an aerial vehicle or ground vehicle.

Clause 91. The mobile device of any of clauses 83-90, wherein the at least one processor is further configured to:
store SPS signal data measured during the off duration of the uplink signal transmission; and
process the SPS signal data during the on duration of the uplink signal transmission.

Clause 92. The mobile device of any of clauses 83-91, wherein the at least one processor is further configured to perform non-coherent integration with SPS signals received in the first frequency band by the SPS receiver across consecutive off durations of the uplink signal transmission.

Clause 93. The mobile device of any of clauses 83-92, wherein the SPS signal acquisition comprises one or more of an initial acquisition of SPS signals in the first frequency band, verification of SPS signals in the first frequency band, and at least one of signal bit edge alignment and secondary code alignment or a combination thereof Clause 94. The mobile device of any of clauses 83-93, wherein the at least one processor is further configured to:
measure SPS signals received in a second frequency band by the SPS receiver, wherein the second frequency band is not interfered with by transmissions of uplink signals; and
process SPS signal data measured in the second frequency band during the SPS signal acquisition.

Clause 95. The mobile device of any of clauses 83-93, wherein the at least one processor is further configured to:
measure SPS signals received in a second frequency band by the SPS receiver, wherein the second frequency band is not interfered with by transmissions of uplink signals; and
wherein SPS signal data measured in the first frequency band during the off duration of the uplink signal transmission and SPS signal data measured in the second frequency band are used for the SPS signal tracking.

Clause 96. The mobile device of clause 95, wherein the SPS signals received in the second frequency band by the SPS receiver are measured during only the on duration of the uplink signal transmission or during both the off duration and the on duration of the uplink signal transmission.

Clause 97. The mobile device of clause 95, wherein the first frequency band is in an L1 band and the second frequency band comprises one or more of an L2 band and an L5 band.

Clause 98. The mobile device of any of clauses 83-97, wherein the SPS signals received in the first frequency band comprises at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal.

Clause 99. The mobile device of any of clauses 83-98, wherein the wireless transceiver is a satellite vehicle in a satellite communication system.

Clause 100. The mobile device of any of clauses 83-99, wherein the wireless transceiver is a terrestrial base station in a Radio Access Technology (RAT).

Clause 101. A mobile device configured to support concurrent performance of wireless communications and satellite positioning system (SPS) operation, the mobile device comprising:
means for determining a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver;
means for determining a measurement dwell time based on the off duration of the uplink signal transmission; and
means for performing SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals.

Clause 102. The mobile device of clause 101, wherein the SPS signals received in the first frequency band by the SPS receiver during the on duration of the uplink signal transmission are blanked, and SPS signals received during the off duration and blanked SPS signals received during the on duration are used in a measurement operation, and wherein the measurement dwell time is effectively aligned with the off duration of the uplink signal transmission by reporting a measurement time stamp for the measurement operation that is based on the off duration of the uplink signal transmission.

Clause 103. The mobile device of either of clauses 101 or 102, wherein an amount of the measurement dwell time extends into the on duration of the uplink signal during which the SPS signals received in the first frequency band by the SPS receiver are not blanked, the amount of the measurement dwell time that extends into the on duration of the uplink signal is constrained based on a desired tolerance of the performance of the SPS signal acquisition or the SPS signal tracking.

Clause 104. The mobile device of either of clauses 101 or 102, wherein the measurement dwell time is constrained to be less than or equal to the off duration of the uplink signal transmission.

Clause 105. The mobile device of clause 104, wherein the measurement dwell time is a total integration time comprising a product of a coherent integration interval and a number of non-coherents.

Clause 106. The mobile device of clause 105, wherein constraining the measurement dwell time based on the off duration of the uplink signal transmission comprises adjusting the number of non-coherents.

Clause 107. The mobile device of any of clauses 101-106, wherein the means for performing SPS signal acquisition or tracking using the SPS signals received in the first frequency band by the SPS receiver measures the SPS signals for a plurality of measurement dwell times within a single off duration of the uplink signal transmission.

Clause 108. The mobile device of any of clauses 101-107, wherein the mobile device is in one of a semiautonomous vehicle or an autonomous vehicle comprising one of an aerial vehicle or ground vehicle.

Clause 109. The mobile device of any of clauses 101-108, further comprising:
means for storing SPS signal data measured during the off duration of the uplink signal transmission; and
means for processing the SPS signal data during the on duration of the uplink signal transmission.

Clause 110. The mobile device of any of clauses 101-109, further comprising means for performing non-coherent integration with SPS signals received in the first frequency band by the SPS receiver across consecutive off durations of the uplink signal transmission.

Clause 111. The mobile device of any of clauses 101-110, wherein the SPS signal acquisition comprises one or more of initial acquisition of SPS signals in the first frequency band, verification of SPS signals in the first frequency band, and at least one of signal bit edge alignment and secondary code alignment or a combination thereof.

Clause 112. The mobile device of any of clauses 101-111, further comprising:
means for measuring SPS signals received in a second frequency band by the SPS receiver, wherein the second frequency band is not interfered with by transmissions of uplink signals; and
means for processing SPS signal data measured in the second frequency band during the SPS signal acquisition.

Clause 113. The mobile device of any of clauses 101-111, further comprising:
means for measuring SPS signals received in a second frequency band by the SPS receiver, wherein the second frequency band is not interfered with by transmissions of uplink signals; and
wherein SPS signal data measured in the first frequency band during the off duration of the uplink signal transmission and SPS signal data measured in the second frequency band are used for the SPS signal tracking.

Clause 114. The mobile device of clause 113, wherein the SPS signals received in the second frequency band by the SPS receiver are measured during only the on duration of the uplink signal transmission or during both the off duration and the on duration of the uplink signal transmission.

Clause 115. The mobile device of clause 113, wherein the first frequency band is in an L1 band and the second frequency band comprises one or more of an L2 band and an L5 band.

Clause 116. The mobile device of any of clauses 101-115, wherein the SPS signals received in the first frequency band comprises at least one of a Galileo E1 signal, a BeiDou (BDS) B1 signal, a BDS B1C signal, a Global Navigation Satellite System (GLONASS) G1 signal, a GLONASS L1OC signal, a Global Positioning System (GPS) L1, and a GPS L1C signal.

Clause 117. The mobile device of any of clauses 101-116, wherein the wireless transceiver is a satellite vehicle in a satellite communication system.

Clause 118. The mobile device of any of clauses 101-117, wherein the wireless transceiver is a terrestrial base station in a Radio Access Technology (RAT).

Clause 119. A non-transitory storage medium including program code stored thereon, the program code is operable to configure at least one processor in a mobile device to support concurrent performance of wireless communications and satellite positioning system (SPS) operation, the program code comprising instructions to:
determine a start, an on duration, and an off duration of an uplink signal transmission on a wireless link to a wireless transceiver, wherein transmission of uplink signals on the wireless communication link interferes with at least one frequency band in a plurality of frequency bands received by an SPS receiver;
determine a measurement dwell time based on the off duration of the uplink signal transmission; and
perform SPS signal acquisition or SPS signal tracking using SPS signals received in a first frequency band by the SPS receiver for the measurement dwell time aligned with the off duration of the uplink signal transmission, and not using the SPS signals received in the first frequency band by the SPS receiver during the on duration of the uplink signal transmission, wherein the first frequency band is interfered with by transmissions of uplink signals.

Clause 120. The non-transitory storage medium of clause 119, wherein the SPS signals received in the first frequency band by the SPS receiver during the on duration of the uplink signal transmission are blanked, and SPS signals received during the off duration and blanked SPS signals received during the on duration are used in a measurement operation, and wherein the measurement dwell time is effectively aligned with the off duration of the uplink signal transmission by reporting a measurement time stamp for the measurement operation that is based on the off duration of the uplink signal transmission.

Clause 121. The non-transitory storage medium of either of clauses 119 or 120, wherein an amount of the measurement dwell time extends into the on duration of the uplink signal during which the SPS signals received in the first frequency band by the SPS receiver are not blanked, the amount of the measurement dwell time that extends into the on duration of the uplink signal is constrained based on a desired tolerance of the performance of the SPS signal acquisition or the SPS signal tracking.

Clause 122. The non-transitory storage medium of either of clauses 119 or 120, wherein the measurement dwell time is constrained to be less than or equal to the off duration of the uplink signal transmission.

Clause 123. The non-transitory storage medium of clause 122, wherein the measurement dwell time is a total integration time comprising a product of a coherent integration interval and a number of non-coherents.

Clause 124. The non-transitory storage medium of clause 123, wherein constraining the measurement dwell time based on the off duration of the uplink signal transmission comprises adjusting the number of non-coherents.

Clause 125. The non-transitory storage medium of any of clauses 119-124, wherein the SPS signals received in the first frequency band by the SPS receiver are measured for a plurality of measurement dwell times within a single off duration of the uplink signal transmission.

Clause 126. The non-transitory storage medium of any of clauses 119-125, wherein the mobile device is in one of a semiautonomous vehicle or an autonomous vehicle comprising one of an aerial vehicle or ground vehicle.

Clause 127. The non-transitory storage medium of any of clauses 119-126, wherein the program code further comprises instructions to:
store SPS signal data measured during the off duration of the uplink signal transmission; and
process the SPS signal data during the on duration of the uplink signal transmission.

Clause 128. The non-transitory storage medium of any of clauses 119-127, wherein the program code further comprises instructions to perform non-coherent integration with SPS signals received in the first frequency band by the SPS receiver across consecutive off durations of the uplink signal transmission.

Clause 129. The non-transitory storage medium of any of clauses 119-128, wherein the SPS signal acquisition comprises one or more of an initial acquisition of SPS signals in the first frequency band, verification of SPS signals in the first frequency band, and at least one of signal bit edge alignment and secondary code alignment or a combination thereof.

Clause 130. The non-transitory storage medium of any of clauses 119-129, wherein the program code further comprises instructions to:
measuring SPS signals received in a second frequency band by the SPS receiver, wherein the second frequency band is not interfered with by transmissions of uplink signals; and
processing SPS signal data measured in the second frequency band during the SPS signal acquisition.

Clause 131. The non-transitory storage medium of any of clauses 119-129, wherein the program code further comprises instructions to:
measuring SPS signals received in a second frequency band by the SPS receiver, wherein the second frequency band is not interfered with by transmissions of uplink signals; and
wherein SPS signal data measured in the first frequency band during the off duration of the uplink signal transmission and SPS signal data measured in the second frequency band are used for the SPS signal tracking.

Clause 132. The non-transitory storage medium of clause 131, wherein the SPS signals received in the second frequency band by the SPS receiver are measured during only the on duration of the uplink signal transmission or during both the off duration and the on duration of the uplink signal transmission.

Clause 133. The non-transitory storage medium of clause 131, wherein the first frequency band is in an L1 band and the second frequency band comprises one or more of an L2 band and an L5 band.

Clause 134. The non-transitory storage medium of any of clauses 119-133, wherein the SPS signals received in the first frequency band comprises at least one of a Galileo E1 signal, a BeiDou (BDS) B1 signal, a BDS B 1C signal, a Global Navigation Satellite System (GLONASS) G1 signal, a GLONASS L1OC signal, a Global Positioning System (GPS) L1, and a GPS L1C signal.

Clause 135. The non-transitory storage medium of any of clauses 119-134, wherein the wireless transceiver is a satellite vehicle in a satellite communication system.

Clause 136. The non-transitory storage medium of any of clauses 119-135, wherein the wireless transceiver is a terrestrial base station in a Radio Access Technology (RAT).

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. A method of wireless communication at a mobile device, comprising:
receiving a request for a satellite communication from an internal application of the mobile device or a user interaction;
determining if satellite positioning systems (SPS) signals have been acquired for a SPS operation;
pausing a satellite communication link if it is determined that the SPS signals have not been acquired, wherein the SPS signals have multiple frequency bands;
acquiring the SPS signals for the SPS operation;
computing a position of the mobile device based on the SPS operation; and
engaging in the satellite communication link with a communication satellite, wherein the communication satellite is part of a wireless communication network.

2. The method of claim 1, further comprising:
performing the satellite communication and the SPS operation concurrently.

3. The method of claim 1, wherein computing the position of the mobile device based on the SPS operation comprises:
acquiring the SPS signals for tracking with an SPS receiver; and
tracking the SPS signals via the SPS receiver.

4. The method of claim 1, wherein computing the position of the mobile device based on the SPS operation comprises:
receiving the SPS signals from a set of positioning satellites; and
performing SPS measurements based on the SPS signals from the set of positioning satellites.

5. The method of claim 1,
wherein transmission of uplink signals on the satellite communication link interferes with at least one of the multiple frequency bands in the SPS signals, the method further comprising:
controlling an SPS receiver to mitigate the interference of the transmission of the uplink signals on the satellite communication link with the at least one of the multiple frequency bands in the SPS signals.

6. The method of claim 1, wherein the satellite communication is associated with emergency services.

7. The method of claim 1, wherein the SPS operation corresponds to a Global Navigation Satellite System (GNSS) operation.

8. The method of claim 1, wherein the satellite communication is associated with non-terrestrial Wireless Wide Area Networks (WWANs).

9. The method of claim 1, wherein the satellite communication includes the computed position of the mobile device.

10. The method of claim 1, wherein computing the position of the mobile device based on the SPS operation comprises:
computing, in response to the request, the position of the mobile device based on the SPS operation.

11. An apparatus for wireless communication at a mobile device, comprising:
at least one memory; and
at least one processor coupled to the at least one memory and, based at least in part on information stored in the at least one memory, the at least one processor, individually or in any combination, is configured to:
receive a request for a satellite communication from an internal application of the mobile device or a user interaction;
determine if satellite positioning systems (SPS) signals have been acquired for a SPS operation;
pause a satellite communication link if it is determined that the SPS signals have not been acquired, wherein the SPS signals have multiple frequency bands;
acquire the SPS signals for the SPS operation;
compute a position of the mobile device based on the SPS operation; and
engage in the satellite communication link with a communication satellite, wherein the communication satellite is part of a wireless communication network.

12. The apparatus of claim 11, wherein the at least one processor, individually or in any combination, is further configured to:
perform the satellite communication and the SPS operation concurrently.

13. The apparatus of claim 11, wherein to compute the position of the mobile device based on the SPS operation, the at least one processor, individually or in any combination, is configured to:
acquire the SPS signals for tracking with an SPS receiver; and
track the SPS signals via the SPS receiver.

14. The apparatus of claim 11, wherein to compute the position of the mobile device based on the SPS operation, the at least one processor, individually or in any combination, is configured to:
receive the SPS signals from a set of positioning satellites; and
perform SPS measurements based on the SPS signals from the set of positioning satellites.

15. The apparatus of claim 11,
wherein transmission of uplink signals on the satellite communication link interferes with at least one of the multiple frequency bands in the SPS signals, the at least one processor, individually or in any combination, is further configured to:
control an SPS receiver to mitigate the interference of the transmission of the uplink signals on the satellite communication link with the at least one of the multiple frequency bands in the SPS signals.

16. The apparatus of claim 11, wherein the satellite communication is associated with emergency services.

17. The apparatus of claim 11, wherein the SPS operation corresponds to a Global Navigation Satellite System (GNSS) operation.

18. The apparatus of claim 11, wherein the satellite communication is associated with non-terrestrial Wireless Wide Area Networks (WWANs).

19. The apparatus of claim 11, wherein the satellite communication includes the computed position of the mobile device.

20. The apparatus of claim 11, wherein to compute the position of the mobile device based on the SPS operation, the at least one processor, individually or in any combination, is configured to:
compute, in response to the request, the position of the mobile device based on the SPS operation.

21. An apparatus for wireless communication at a mobile device, comprising:
means for receiving a request for a satellite communication from an internal application of the mobile device or a user interaction;
means for determining if satellite positioning systems (SPS) signals have been acquired for a SPS operation;
means for pausing a satellite communication link if it is determined that the SPS signals have not been acquired, wherein the SPS signals have multiple frequency bands;
means for acquiring the SPS signals for the SPS operation;
means for computing a position of the mobile device based on the SPS operation; and
means for engaging in the satellite communication link with a communication satellite, wherein the communication satellite is part of a wireless communication network.

22. The apparatus of claim 21, further comprising:
means for performing the satellite communication and the SPS operation concurrently.

23. The apparatus of claim 21, wherein the means for computing the position of the mobile device based on the SPS operation comprises:
means for acquiring the SPS signals for tracking with an SPS receiver; and
means for tracking the SPS signals via the SPS receiver.

24. The apparatus of claim 21, further comprising:
wherein transmission of uplink signals on the satellite communication link interferes with at least one of the multiple frequency bands in the SPS signals, the apparatus further comprising:
means for controlling an SPS receiver to mitigate the interference of the transmission of the uplink signals on the satellite communication link with the at least one of the multiple frequency bands in the SPS signals.

25. A non-transitory computer-readable medium storing computer executable code at a mobile device, the code when executed by at least one processor causes the at least one processor to:

receive a request for a satellite communication from an internal application of the mobile device or a user interaction;
determine if satellite positioning systems (SPS) signals have been acquired for a SPS operation;
pause a satellite communication link if it is determined that the SPS signals have not been acquired, wherein the SPS signals have multiple frequency bands;
acquire the SPS signals for the SPS operation;
compute a position of the mobile device based on the SPS operation; and
engage in the satellite communication link with a communication satellite, wherein the communication satellite is part of a wireless communication network.

* * * * *